US012750116B2

(12) United States Patent
Wang et al.

(10) Patent No.: US 12,750,116 B2
(45) Date of Patent: Sep. 29, 2026

(54) INTEGRATED ACCESS BACKHAUL WITH AN ADAPTIVE PHASE-CHANGING DEVICE

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 357 days.

(21) Appl. No.: 18/257,511

(22) PCT Filed: Dec. 22, 2021

(86) PCT No.: PCT/US2021/064889
§ 371 (c)(1),
(2) Date: Jun. 14, 2023

(87) PCT Pub. No.: WO2022/146830
PCT Pub. Date: Jul. 7, 2022

(65) Prior Publication Data

US 2024/0039608 A1 Feb. 1, 2024

Related U.S. Application Data

(60) Provisional application No. 63/133,661, filed on Jan. 4, 2021.

(51) Int. Cl.
*H04B 7/06* (2006.01)

(52) U.S. Cl.
CPC ................................ *H04B 7/06952* (2023.05)

(58) Field of Classification Search
CPC .............. H04B 7/04013; H04B 7/0695; H04B 7/06952; H04B 7/088; H04B 7/15528
See application file for complete search history.

(56) References Cited

U.S. PATENT DOCUMENTS 12,309,761 B2 * 5/2025 Dallal .................. H04B 7/0617
2018/0092139 A1 3/2018 Novlan et al.
2020/0145965 A1 5/2020 Luo et al.
2020/0322037 A1 10/2020 Abedini et al.
(Continued)

FOREIGN PATENT DOCUMENTS

CN 102726097 A 10/2012
CN 111050277 4/2020
(Continued)

OTHER PUBLICATIONS

"International Search Report and Written Opinion", Application No. PCT/US2021/064889, Sep. 22, 2022, 22 pages.
(Continued)

*Primary Examiner* — Nguyen T Vo
(74) *Attorney, Agent, or Firm* — Colby Nipper PLLC

(57) ABSTRACT

Techniques and apparatuses are described for integrated access backhaul with an adaptive phase-changing device (APD) are described. In aspects, a donor base station determines to include an APD in a communication path for the wireless backhaul link with a node base station and apportions APD access to the APD for the node base station. The donor base station then communicates with the node base station using the surface of the APD and based on the apportioned APD-access by using the surface to exchange wireless signals with the donor base station.

19 Claims, 17 Drawing Sheets

(56) References Cited

U.S. PATENT DOCUMENTS

| | | | | |
|---|---|---|---|---|
| 2020/0344686 | A1 | 10/2020 | Venugopal et al. | |
| 2020/0358501 | A1 | 11/2020 | Hormis et al. | |
| 2021/0126359 | A1 * | 4/2021 | Kim | H04B 7/145 |
| 2022/0109492 | A1 * | 4/2022 | Abedini | H04B 7/0639 |
| 2022/0216908 | A1 * | 7/2022 | Choi | H04B 7/043 |
| 2023/0041198 | A1 * | 2/2023 | Chen | H04B 7/04013 |
| 2023/0308141 | A1 * | 9/2023 | Wang | H04W 72/53 |
| 2023/0421412 | A1 * | 12/2023 | Zegrar | H04B 7/086 |
| 2024/0022315 | A1 * | 1/2024 | Kusashima | H04W 16/26 |

FOREIGN PATENT DOCUMENTS

| | | |
|---|---|---|
| KR | 102192234 | 12/2020 |
| WO | 2020254031 | 12/2020 |
| WO | 2021109345 | 6/2021 |
| WO | 2021164676 | 8/2021 |
| WO | 2022146830 | 7/2022 |

OTHER PUBLICATIONS

Al-Jarrah, M , et al., "Performance Analysis of Wireless Mesh Backhauling Using Intelligent Reflecting Surfaces", Jun. 2020, 27 pages.

Atapattu, Saman , et al., "Reconfigurable Intelligent Surface Assisted Two-way Communications: Performance Analysis and Optimization", Jan. 22, 2020, 15 pages.

Jeon, Hong-Bae , "An Energy-efficient Aerial Backhaul System with Reconfigurable Intelligent Surface", Apr. 5, 2021, 14 pages.

Khaleel, Aymen , "A Novel NOMA Solution with RIS Partitioning", Jun. 12, 2021, 11 pages.

Ronkainen, Henrik , et al., "Integrated access and backhaul—a new type of wireless backhaul in 5G", Jun. 23, 2020, 16 pages.

Wu, Qingqing , et al., "Intelligent Reflecting Surface Aided Wireless Communications: A Tutorial", IEEE Transactions on Communications, vol. 69, No. 5, Piscataway, NJ, USA, Jul. 7, 2020, 74 pages.

"International Preliminary Report on Patentability", Application No. PCT/US2021/064889, Jul. 4, 2023, 16 pages.

"Foreign Office Action", CN Application No. 202180087754.3, Oct. 20, 2025, 22 pages.

"Invitation to Pay Additional Fees", Application No. PCT/US2021/064889, Jul. 25, 2022, 14 pages.

"Foreign Office Action", EP Application No. 21854956.6, Dec. 22, 2025, 9 pages.

Tekbiyik, et al., "Channel Estimation for Full-Duplex RIS-assisted HAPS Backhauling with Graph Attention Networks", Oct. 22, 2020, 6 pages.

"Foreign Office Action", CN Application No. 202180087754.3, Apr. 30, 2026, 16 pages.

* cited by examiner

| Surface-Configuration Codebook 508 | | | | |
|---|---|---|---|---|
| *Index* | *Configuration for Element 502* | *Configuration for Element 504* | *Configuration for Element 506* | . . . |
| 0 | Phase Configuration 0 | Phase Configuration 1 | Phase Configuration 2 | . . . |
| 1 | Phase Configuration 3 | Phase Configuration 4 | Phase Configuration 5 | . . . |
| 2 | . . . | . . . | . . . | . . . |

INTEGRATED ACCESS BACKHAUL WITH AN ADAPTIVE PHASE-CHANGING DEVICE

RELATED APPLICATION(S)

This application is a national stage entry of International Application No. PCT/US2021/064889, filed Dec. 22, 2021, which claims the benefit of U.S. Provisional Application No. 63/133,661, filed Jan. 4, 2021, the disclosures of which are incorporated herein by reference in their entirety.

BACKGROUND

Evolving wireless communication systems, such as fifth generation (5G) technologies and sixth generation (6G) technologies, use various techniques that increase data capacity relative to preceding wireless networks. As one example, 5G technologies transmit data using higher frequency ranges, such as the above-6Gigahertz (GHz) band or the THz band. As another example, the 5G technologies support multiple-input, multiple-output (MIMO) communications that use multiple transmission and/or reception paths.

The higher frequency ranges for 5G systems can provide bandwidth to support integrated access backhaul (IAB) between 5G base stations. While these techniques are capable of increasing data capacity, transmitting and recovering information using these higher frequency ranges also poses challenges. The higher frequency signals and MIMO transmissions, for instance, are more susceptible to multipath fading and other types of path loss, which lead to recovery errors at a receiver. To provide a reliable and flexible IAB link using wireless communications, it becomes desirable to compensate for signal distortions to obtain the performance benefits (e.g., increased data capacity) provided by these approaches.

SUMMARY

This document describes techniques and apparatuses for integrated access backhaul with an adaptive phase-changing device (APD). In aspects, a donor base station determines to include an APD in a communication path for the wireless backhaul link with a node base station and apportions APD access to the APD for the node base station. The donor base station then communicates with the node base station over the wireless backhaul link by exchanging wireless signals with the node base station using a surface of the APD and based on the apportioned APD-access.

In aspects, a node base station determines to establish a wireless backhaul link with a donor base station. The node base station receives apportioned APD-access to an APD from the donor base station, where the apportioned APD-access includes at least apportioned reflection-access for using a surface of the APD. The node base station then communicates with the donor base station by using the surface of the APD and based on the apportioned APD-access by using the surface to exchange wireless signals with the donor base station.

In aspects, an APD receives, from a base station and over an APD-control channel, an indication of a node index. The APD identifies a surface configuration using the node index and then modifies the surface of the APD using the surface configuration.

The details of one or more implementations for integrated access backhaul with an APD are set forth in the accompanying drawings and the following description. Other features and advantages will be apparent from the description, the drawings, and the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects for integrated access backhaul with an adaptive phase-changing device (APD) are described with reference to the following drawings. The same numbers are used throughout the drawings to reference like features and components.

DETAILED DESCRIPTION

Figure 1:
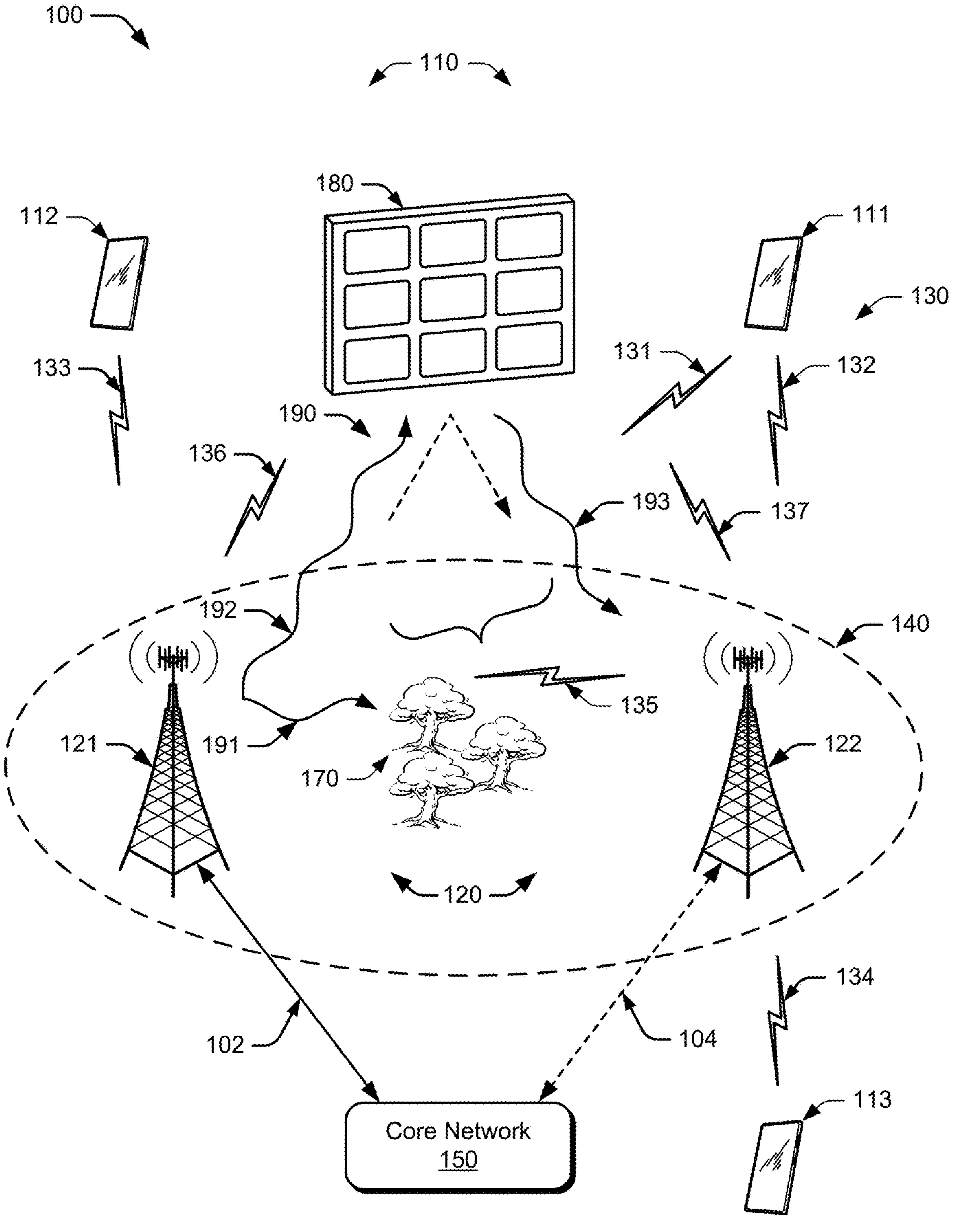
FIG. 1 illustrates an example operating environment in which various aspects of integrated access backhaul with an APD can be implemented.

Base stations communicate with one another to coordinate various types of wireless-network services, such as dual-connectivity, carrier aggregation, coordinated multipoint (CoMP), and so forth. Oftentimes, successfully coordinating these services relies on low latency and/or high-throughput backhaul communications between the base stations (e.g., base-station-to-base-station communications, base-station-to-core-network communications). In some aspects, the base stations exchange backhaul communications through fiber-optic cables. However, deploying fiber-optic cables can be cost prohibitive and sometimes inconvenient. To illustrate, consider a portable base station that an operator deploys to various locations to temporarily increase and/or boost services provided by a wireless network, such as to an outdoor concert, then to a running race, followed by an outdoor 3-on-3 basketball tournament, and so forth. While the portable base station allows the operator to accommodate the temporary strain on the wireless network caused by large crowds carrying mobile devices, connecting the portable base station to a fixed base station through a fiber cable may be problematic.

Integrated access backhaul (IAB) uses part of a wireless network's spectrum (e.g., fifth-generation (5G) millimeter Wave (mmWave) spectrum) to provide a wireless backhaul link between base stations. A donor base station in a wireless network, for example, maintains a connection to a core network. The donor base station allocates air interface resources of the wireless network to the wireless backhaul link and communicates over the wireless backhaul link with a node base station to provide the node base station with access to the core network. In other words, the donor base station serves the node base station with core-network access in a manner similar to serving a UE over an access link, such as by using the allocated air-interface resources and various logical channels of the wireless network (e.g., Physical Uplink Control CHannel (PUCCH), Physical Downlink Control Channel (PDCCH), Physical Uplink Shared CHannel (PUSCH), Physical Downlink Shared Channel (PDCCH)). In some aspects, the node base station optionally maintains a separate link to the core network (e.g., without using the donor base station) and communicates with the donor base station over the IAB link to coordinate the various services. Thus, the node base station may access the core network through the backhaul link (and the donor base station) or a separate link.

While the higher frequencies provide higher data throughput for the backhaul link, channel conditions can negatively impact signal quality. As an example, mmWave signals have high throughput under Line of Sight (LoS) conditions, but reflections create multi-path and frequency-selective fading that may increase recovery errors at the receiver. Changing environments can impact the LoS conditions, such as new foliage growth, precipitation, and/or new building construction obstructing the LoS path. As another example, portable base stations move to varying locations that each have different obstructions.

Adaptive phase-changing devices (APDs) include a Reconfigurable Intelligent Surface (RIS) that, when properly configured, modifies propagating signals to correct for, or reduce, errors introduced by communication path(s), such as small-scale fading and fading MIMO channels. Generally, an RIS includes configurable surface materials that shape how incident signals striking with the surface of the materials are transformed. To illustrate, the configuration of the surface materials can affect the phase, amplitude, and/or polarization of the transformed signal. Thus, modifying a surface configuration of the RIS changes how signals are transformed when they reflect off of the RIS.

In aspects of integrated access backhaul with an APD, a donor base station includes an APD in a communication path with a node base station and uses the surface of the APD to maintain a wireless backhaul link with the node base station. For example, the donor base station and the node base station may establish an initial, direct connection using low-band communications (e.g., below 6 Gigahertz (GHz)) and then use the low-band communications to configure a high-band (e.g., above 6 GHz) wireless backhaul link using the APD. As another example, the donor base station and the node base station establish an initial high-band wireless backhaul link using the APD and location information, and then perform a beam-sweeping procedure to improve the high-band wireless backhaul link. Configuring an APD to maintain a (wireless) IAB link allows the donor base station and the node base station to improve signal quality by routing wireless signals around obstructions to mitigate channel impairments. This helps improve data rates, spectral efficiency, data throughput, and a reliability of communications exchanged over the IAB, which also improves the reliability of communications exchanged in the wireless network.

While features and concepts of the described systems and methods for integrated access backhaul with an APD can be implemented in any number of different environments, systems, devices, and/or various configurations, various aspects of integrated access backhaul with an APD are described in the context of the following example devices, systems, and configurations.

Example Environment

FIG. 1 illustrates an example environment 100, which includes multiple user equipment 110 (UE 110), illustrated as UE 111, UE 112, and UE 113. Each UE can communicate with base stations 120 (illustrated as base stations 121 and 122) through one or more wireless communication links 130 (wireless link 130), illustrated as wireless links 131 132, 133, and 134. To illustrate, the UE 111 communicates with the base station 121 and the base station 122 contemporaneously using the wireless links 131 and 132, respectively. The UE 112 communicates with the base station 121 using the wireless link 133, and the UE 113 communicates with the base station 122 using the wireless link 134. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device, such as a sensor, relay, or actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, distributed base station component, or the like, or any combination thereof.

The wireless links 131, 132, 133, and 134 include control-plane information and/or user-plane data, such as downlink user-plane data and control-plane information communicated from the base stations 120 to the UE 110, uplink of other user-plane data and control-plane information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), fifth-generation New Radio (5G NR), sixth-generation (6G), and so forth. Multiple wireless links 130 may be aggregated in a carrier aggregation or multi-connectivity technology to provide a higher data rate for the UE 110. Multiple wireless links 130 from multiple base stations 120 may be configured for Coordinated Multipoint (CoMP) or dual connectivity communication with the UE 110.

The wireless links 130 include a wireless link 135 between the base station 121 and the base station 122, where the wireless link 135 corresponds to an IAB link between a donor base station (e.g., base station 121) and a node base station (e.g., base station 122). In aspects, the wireless link 135 utilizes wireless signals and an intermediate device (e.g., adaptive phase-changing device 180 (APD 180)) that reflects or transforms ray(s) 190 of the omnidirectional wireless signals, illustrated as signal ray 191, signal ray 192, and signal ray 193. In the environment 100, the signal rays 191 and 192 correspond to rays of a wireless signal from a donor base station to a node base station, but the rays can alternatively or additionally correspond to a wireless signal from the node base station to the donor base station. A first ray of the wireless signal (e.g., the signal ray 191) propagates toward the node base station in a line-of-sight (LoS) manner but is dynamically blocked and/or attenuated by an obstruction 170 (illustrated as foliage). A second ray of the wireless signal (e.g., the signal ray 192) propagates toward the APD 180. The signal ray 192 strikes the surface of the APD 180 and transforms into signal ray 193 that propagates toward the base station 122. In aspects, the signal ray 192 strikes the surface of an RIS of the APD 180, which steers the reflected signal rays (e.g., signal ray 193) toward the base station 122. Although the rays 190 are described as omnidirectional, they may form a wide beam (as shown) or a narrow beam (e.g., in a direction similar to ray 192).

In aspects, the wireless links 130 include a wireless link 136 and/or a wireless link 137 between at least one of the base stations 120 and the APD 180 to control a surface configuration of the APD 180, where the surface configuration directs how the RIS alters signal properties (e.g., direction, phase, amplitude, polarization) of an incident wireless signal. The base stations 120 can also include a wireline interface for communicating control information with the APD 180. As one example, the base station 121 communicates RIS surface-configuration information to the APD 180 using the wireless link 136. To illustrate, the wireless link 136 may correspond to a control channel used by the base station 121 to communicate APD-control information to the APD 180, such as by using an adaptive phase-changing device slow-control channel (APD-slow-control channel) for communicating large quantities of control data (e.g., codebooks) and/or using an adaptive phase-changing device fast-control channel (APD-fast-control channel) for quickly communicating time-sensitive control information (e.g., apply a surface configuration at the start of the next time slot). As another example, the base station 122 communicates RIS surface-configuration information to the APD 180 using the wireless link 137 that can include an APD-slow-control channel and/or an APD-fast-control channel. In some aspects, the wireless link 136 and the wireless link 137 correspond to an APD-control channel shared between the base station 121 and the base station 122, such as through apportioned physical resources.

In various implementations of integrated access backhaul with an APD, a base station 120 (e.g., the base station 121, the base station 122) communicates an index (e.g., a node index, a donor index, a codebook index) to the APD 180 that indicates a surface configuration to apply to the RIS. In some aspects, the base station 120 indicates an index assigned to a particular base station, such as a node index associated with the node base station 122 or a donor index associated with the donor base station 121. Alternatively or additionally, the base station 120 communicates time information that indicates when to apply the surface configuration to the RIS, such as a time slot, a start time, a time-duration, periodic time information (e.g., apply the surface configuration periodically), dynamic time information (e.g., apply the surface configuration once). The base station 120 may communicate direction information (e.g., a donor-to-node communication direction, a node-to-donor communication direction) with the surface configuration such that the APD 180 configures the RIS to reflect a wireless signal in the indicated direction (e.g., by determining or using reciprocal reflection angles). The base station 120 can also determine surface configuration(s) for the APD 180 based on signal-quality measurements, link-quality measurements, location information, historical data records, beam-sweeping procedures, and so forth.

The base stations 120 collectively form part of a Radio Access Network 140 (e.g., RAN, Evolved Universal Terrestrial Radio Access Network, E-UTRAN, 5G NR RAN or NR RAN). In the RAN 140, the base station 121 connects to a core network 150 using an interface 102, and the base station 122 connects to the core network 150 using the IAB link (e.g., the wireless link 135) through the base station 121. However, in alternative implementations, the base station 122 includes a direct connection to the core network 150, illustrated in FIG. 1 as optional interface 104. In aspects, the interface 102 and/or the optional interface 104 includes an NG2 interface for control-plane signaling and an NG3 interface for user-plane data communications when connecting to a 5G core network, or using an Si interface for control-plane signaling and user-plane data communications when connecting to an Evolved Packet Core (EPC) network. The base stations 121 and 122 can exchange user-plane data and/or control-plane information over the wireless IAB link 135. The UE 110 may connect, via the core network 150 and the base station 120, to public networks (e.g., the Internet) to interact with a remote service (not illustrated).

Example Devices

Figure 2:
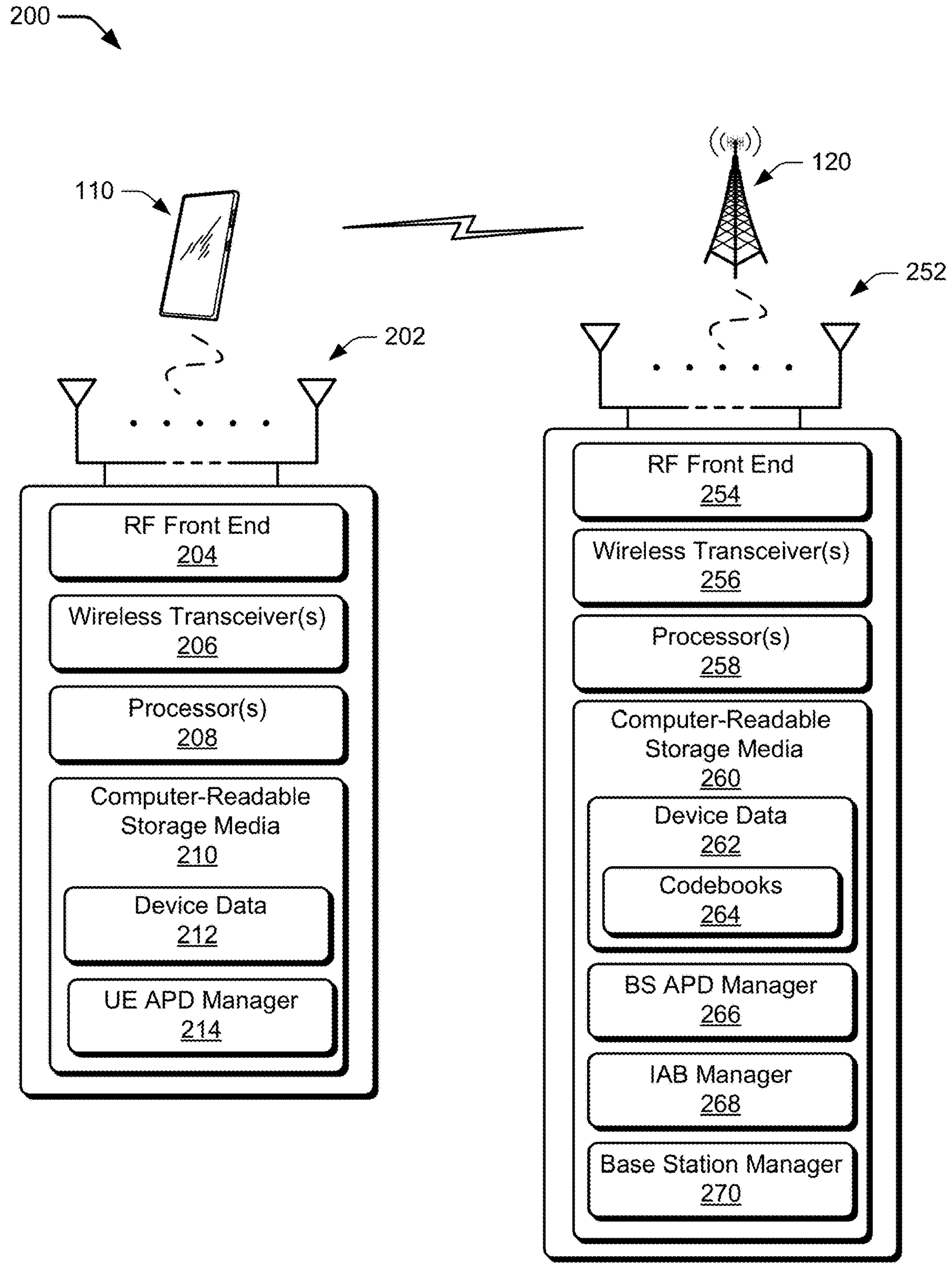
FIG. 2 illustrates an example device diagram of entities that can implement various aspects of integrated access backhaul with an APD.

FIG. 2 illustrates an example device diagram 200 of the UE 110 and base station 120. Generally, the device diagram 200 describes network entities that can implement various aspects of integrated access backhaul with an APD. FIG. 2 shows respective instances of the UE 110 and the base station 120. The UE 110 or the base station 120 may include additional functions and interfaces that are omitted from FIG. 2 for the sake of visual brevity. The UE 110 includes antennas 202, a radio-frequency front end 204 (RF front end 204), and one or more wireless transceivers 206 (e.g., radio-frequency transceivers), such as any combination of an LTE transceiver, a 5G NR transceiver, and/or a 6G transceiver for communicating with base station 120 in the RAN 140. The RF front end 204 of the UE 110 can couple or connect the wireless transceivers 206 to the antennas 202 to facilitate various types of wireless communication.

The antennas 202 of the UE 110 may include an array of multiple antennas that are configured in a manner similar to or different from each other. The antennas 202 and the RF front end 204 can be tuned to, and/or be tunable to, one or more frequency bands defined by communication standards (e.g., 3GPP LTE, 5G NR) and implemented by the wireless transceiver(s) 206. Additionally, the antennas 202, the RF front end 204, and/or the wireless transceiver(s) 206 may be configured to support beam-sweeping for the transmission and reception of communications with the base stations 120. By way of example and not limitation, the antennas 202 and the RF front end 204 can be implemented for operation in sub-gigahertz bands, sub-6 GHz bands, and/or above 6 GHz bands that are defined by the 3GPP LTE and 5G NR communication standards (e.g., 57-64 GHz, 28 GHz, 38 GHz, 71 GHz, 81 GHz, or 92 GHz bands).

The UE 110 also includes processor(s) 208 and computer-readable storage media 210 (CRM 210). The processor 208 may be a single-core processor or a multiple-core processor implemented with a homogenous or heterogeneous core structure. The computer-readable storage media described herein excludes propagating signals. CRM 210 may include any suitable memory or storage device such as random-access memory (RAM), static RAM (SRAM), dynamic RAM (DRAM), non-volatile RAM (NVRAM), read-only memory (ROM), or Flash memory useable to store device data 212 of the UE 110. The device data 212 includes any combination of user data, multimedia data, applications, and/or an operating system of the UE 110. In implementations, the device data 212 stores processor-executable instructions that are executable by the processor(s) 208 to enable user-plane communication, control-plane signaling, and user interaction with the UE 110.

In aspects, the CRM 210 of the UE 110 includes a user equipment adaptive phase-changing device manager 214 (UE APD manager 214) for managing APD usage in an access link with the base station 120. Alternatively or additionally, the UE APD manager 214 may be implemented in whole or in part as hardware logic or circuitry integrated with or separate from other components of the base UE 110. In aspects, the UE APD manager 214 receives APD-access information for using a surface of an APD, such as reflection-access information that indicates time information on when to use the APD surface and/or configurable surface element information that indicates portions of the APD surface available to the UE 110. The UE APD manager 214 directs the UE 110 to transmit communications with the base station 120 based on the APD-access information.

The device diagram for the base station 120, shown in FIG. 2, includes a single network node (e.g., a gNode B). The functionality of the base station 120 may be distributed across multiple network nodes or devices and may be distributed in any fashion suitable to perform the functions described herein. The base station 120 includes antennas 252, a radio-frequency front end 254 (RF front end 254), one or more wireless transceiver(s) 256 (e.g., radio-frequency transceivers) for communicating with the UE 110 and/or another base station 120, such as LTE transceivers, 5G NR transceivers, and/or 6G transceivers. The RF front end 254 of the base station 120 can couple or connect the wireless transceivers 256 to the antennas 252 to facilitate various types of wireless communication. The antennas 252 of the base station 120 may include an array of multiple antennas that are configured in a manner similar to or different from each other. The antennas 252 and the RF front end 254 can be tuned to, and/or be tunable to, one or more frequency bands defined by communication standards (e.g., 3GPP LTE, 5G NR) and implemented by the wireless transceivers 256. Additionally, the antennas 252, the RF front end 254, and/or the wireless transceivers 256 may be configured to support beamforming, such as Massive-MIMO, for the transmission and reception of communications with the UE 110 and/or another base station 120.

The base station 120 also includes processor(s) 258 and computer-readable storage media 260 (CRM 260). The processor 258 may be a single-core processor or a multiple-core processor composed of a variety of materials, such as silicon, polysilicon, high-K dielectric, copper, and so on. CRM 260 may include any suitable memory or storage device such as RAM, SRAM, DRAM, NVRAM, ROM, or Flash memory useable to store device data 262 of the base stations 120. The device data 262 includes network-scheduling data, radio resource-management data, applications, and/or an operating system of the base station 120, which are executable by processor(s) 258 to enable communication with another base station 120 and/or the UE 110. The device data 262 also includes codebooks 264. The codebooks 264 may include any suitable type or combination of codebooks, including surface-configuration codebooks that store surface-configuration information for a RIS of an APD and beam-sweeping codebooks that store patterns, sequences, or timing information for implementing multiple surface-configurations useful to direct an APD to perform a variety of reflective beamforming. In some aspects, the surface-configuration codebooks and beam-sweeping codebooks include phase-vector information, angular information (e.g., calibrated to respective phase vectors), and/or beam-configuration information.

In aspects, the CRM 260 of the base station 120 also includes a base station adaptive phase-changing device manager 266 (BS APD manager 266) for managing APD usage in an IAB communication path to another base station 120. Alternatively or additionally, the BS APD manager 266 may be implemented in whole or part as hardware logic or circuitry integrated with or separate from other components of the base station 120. In aspects, the BS APD manager 266 identifies APDs within transmission range that can be used in an IAB communication path. The BS APD manager 266 also indicates surface configurations to the APD (e.g., RIS configurations), timing information, and/or direction information. In some implementations, such as when the base station 120 acts as a donor base station, the BS APD manager 266 apportions APD-access to a node base station, such as apportioning reflection-access for using a surface of an APD and/or control-access for communicating directly with the APD. In other implementations, such as when the base station 120 acts as a node base station, the BS APD manager 266 receives apportioned APD-access and allocates some of the apportioned APD-access for communicating with the UE 110 over an access link and/or another node base station by using the surface of the APD to direct or steer wireless signals. The BS APD manager 266 also coordinates beam-sweeping procedures performed using an APD and another base station 120.

The CRM 260 also includes a base station manager 270 for managing various functionalities and communication interfaces of the base stations 120. Alternatively or additionally, the base station manager 270 may be implemented in whole or in part as hardware logic or circuitry integrated with or separate from other components of the base stations 120. In at least some aspects, the base station manager 270 configures the antennas 252, RF front end 254, and wireless transceivers 256 for communication with another base station over a wireless IAB link (e.g., the wireless link 135) and/or the UE 110 using an access link (e.g., the wireless link 131, the wireless link 132, the wireless link 133, the wireless link 134), and/or the APD 180 (e.g., the wireless link 136, the wireless link 137). The base station 120 sometimes includes a core network interface (not shown) that the base station manager 270 configures to exchange user-plane data and control-plane information with core network functions and/or entities.

Figure 3:
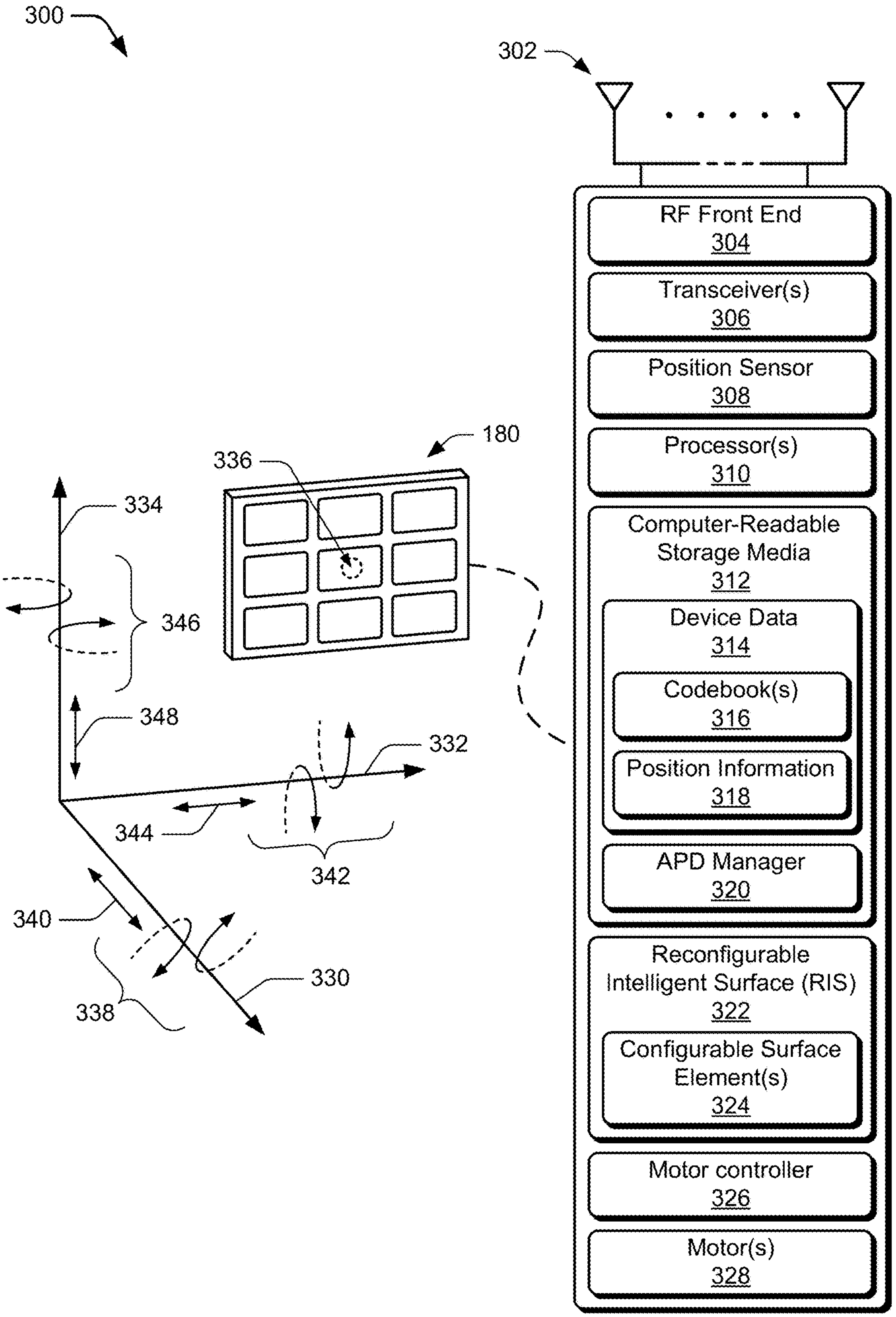
FIG. 3 illustrates an example device diagram of an APD that can be used in accordance with one or more aspects of integrated access backhaul with an APD.

FIG. 3 illustrates an example device diagram 300 of the APD 180. Generally, the device diagram 300 describes an example entity with which various aspects of integrated access backhaul with an APD can be implemented but may include additional functions and interfaces that are omitted from FIG. 3 for the sake of visual clarity. The APD 180 includes one or more antenna(s) 302, a radio-frequency front end 304 (RF front end 304), and one or more wireless transceivers 306 (e.g., radio-frequency transceivers) for wirelessly communicating with the base station 120 and/or the UE 110. The APD 180 can also include a position sensor, such as a Global Navigation Satellite System (GNSS) module, that provides position information based on a location of the APD 180.

The antenna(s) 302 of the APD 180 may include an array of multiple antennas that are configured in a manner similar to or different from each other. Additionally, the antennas 302, the RF front end 304, and the transceiver(s) 306 may be configured to support beamforming for the transmission and reception of communications with the base station 120 and/or the UE 110. By way of example and not limitation, the antennas 302 and the RF front end 304 can be implemented for operation in sub-gigahertz bands, sub-6 GHz bands, and/or above 6 GHz bands. Thus, the antenna 302, the RF front end 304, and the transceiver(s) 306 provide the APD 180 with an ability to receive and/or transmit communications with the base station 120 and/or the UE 110, such as information transmitted using APD-control channels (e.g., an APD-slow-control channel or APD-fast-control channel) as further described.

The APD 180 includes processor(s) 310 and computer-readable storage media 312 (CRM 312). The processor 310 may be a single-core processor or a multiple-core processor implemented with a homogenous or heterogeneous core-structure. The computer-readable storage media described herein excludes propagating signals. CRM 312 may include any suitable memory or storage device such as RAM, SRAM, DRAM, NVRAM, ROM, or Flash memory useable to store device data 314 of the APD 180. The device data 314 includes user data, multimedia data, applications, and/or an operating system of the APD 180, which are executable by processor(s) 310 to enable dynamic configuration of the APD 180 as further described. The device data 314 also includes one or more codebooks 316 of any suitable type or combination, and position information 318 of the APD 180. The position information 318 may be obtained or configured using the position sensor 308 or programmed into the APD 180, such as during installation. The position information 318 indicates a position of the APD 180 and may include a location, geographic coordinates, orientation, elevation information, or the like. A base station 120 and/or the UE 110, by way of a BS APD manager 266 and/or the UE APD manager 216, respectively, can use the position information 318 in computing angular or distance information, such as between the base station 120 and APD 180 and/or between the APD 180 and a UE 110 of interest. The codebooks 316 can include surface-configuration codebooks that store surface-configuration information for a RIS of an APD and beam-sweeping codebooks that store patterns, sequences, or timing information (e.g., phase vectors and reflection identifiers) for implementing multiple surface-configurations useful to direct an APD to perform a variety of reflective beamforming. In some aspects, the surface-configuration codebooks and beam-sweeping codebooks include phase-vector information, angular information (e.g., calibrated to respective phase vectors), and/or beam-configuration information.

In aspects of integrated access backhaul with an APD, the CRM 312 of the APD 180 includes an adaptive phase-changing device manager 320 (APD manager 320). Alternatively or additionally, the APD manager 320 may be implemented in whole or in part as hardware logic or circuitry integrated with or separate from other components of the APD 180. Generally, the APD manager 320 manages a surface configuration of the APD 180, such as by processing information exchanged with a base station over wireless link 136 and/or the wireless link 137 and using the information to configure a reconfigurable intelligent surface 322 (MS 322) of the APD 180.

To illustrate, the APD manager 320 receives an indication of a surface configuration over the wireless links 136 and/or 137 (an APD control channel), extracts the surface configuration from the codebooks 316 using the indication, and applies the surface configuration to the RIS 322. This includes receiving a node index associated with a specific node base station, a donor index associated with a specific donor base station, and/or a surface-configuration index, all of which can be used to access an entry in the codebooks 316 as further described. In some aspects, the APD manager 320 receives timing information with the surface configuration communication, where the timing information indicates when to apply the surface configuration to the RIS 322 (e.g., time duration, periodic time information, dynamic time information). Alternatively or additionally, the APD manager 320 receives direction information with the surface configuration that indicates to configure the surface to reflect signals of the RIS 322 based on the direction information. For example, when the direction information indicates a donor-to-node communication direction, the APD manager 320 selects a first surface configuration with a first reflection angle that reflects wireless signals towards a node base station. When the direction indicates a node-to-donor communication direction, the APD 320 selects a second surface configuration with a second, reciprocal reflection angle that reflects wireless signals towards a donor base station.

The APD manager 320 initiates the transmission of uplink messages to the base station 120 over the wireless links 136 and/or 137, such as acknowledgments/negative acknowledgments (ACKs/NACKs) for various APD configuration or management commands. In some aspects, the APD manager 320 receives an indication of a beam-sweeping pattern (e.g., beam-sweeping pattern index) over the wireless links 136 and/or 137 and applies a sequence of various surface configurations to the RIS based on the beam-sweeping pattern and/or in accordance with a synchronization or pattern timing indicated by or received with the indication.

The RIS 322 of the APD 180 includes one or more configurable surface element(s) 324, such as configurable electromagnetic elements, configurable resonator elements, or configurable reflectarray antenna elements. Generally, the configurable surface elements 324 can be selectively or programmatically configured to control how the RIS 322 reflects (e.g., directionality) and/or transforms incident waveforms. By way of example and not of limitation, configurable electromagnetic elements include scattering particles that are connected electronically (e.g., through PIN diodes). Implementations use the electronic connection to arrange the scattering particles, such as based on principles of reflection, to control a directionality, phase, amplitude, and/or polarization of the transformed waveform (from the incident waveform). The RIS 322 can include array(s) of configurable surface element(s) 324, where an array can include any number of elements having any size.

In some aspects, a position and/or orientation of the APD 180 is configurable, and the APD 180 includes a motor controller 326 communicating with one or more motor(s) 328 that are operably coupled with a physical chassis of the APD 180. Based on command and control information, such as received from a base station 120, the motor controller 326 can send commands to the motors 328 that alter one or more kinematic behaviors of the motors 328, which may include any suitable type of stepper motor or servo. For example, the motor controller 326 may issue commands or control signals that specify a shaft rotation of a stepper motor in degrees, a shaft-rotation rate of a stepper motor in revolutions-per-minute (RPM), a linear movement of a linear motor millimeters (mm), a linear velocity of a linear motor in meters/second (m/s). The one or more motors 328, in turn, may be linked to mechanisms that mechanically position the physical chassis or a platform (e.g., avionics of a drone, a drive of a linear rail system, a gimble within a base station, a linear bearing within a base station) supporting the APD 180. Through the commands and signals that the motor controller 326 generates and sends to the motors 328, a physical position, location, or orientation of the APD 180 (and/or the platform supporting the APD 180) may be altered. In response to receiving a position configuration from a base station, the APD manager 320 communicates movement commands to the motor controller 326, such as through a software interface and/or hardware addresses, based on the position configuration. In aspects of integrated access backhaul with an APD, a base station 120 may reposition or reorient one or more APDs 180 to improve or enable wireless signal reflections to be directed to the UE 110.

Generally, the APD 180 can include multiple motors, where each motor corresponds to a different rotational or linear direction of movement. Examples of motor(s) 328 that can be used to control orientation and location of the APD include linear servo motors that might be part of a (i) rail system mounting for the APD, (ii) motors controlling a direction and pitch, yaw, roll of a drone carrying the APD, (iii) radial servo or stepper motors that rotate an axis if the APD is in a fixed position or on a gimbal, and so on. For clarity, the motor controller 326 and the motors 328 are illustrated as being a part of the APD 180, but in alternative or additional implementations, the APD 180 communicates with motor controllers and/or motors external to the APD. To illustrate, the APD manager 320 communicates a position configuration to a motor controller that mechanically positions a platform or chassis that supports the APD 180. In aspects, the APD manager 320 communicates the position configuration to the motor controller using a local wireless link, such as Bluetooth™, Zigbee, IEEE 802.15.4, or a hardwire link. The motor controller then adjusts the platform based on the position configuration using one or more motors. The platform can correspond to, or be attached to, any suitable mechanism that supports rotational and/or linear adjustments, such as a drone, a rail-propulsion system, a hydraulic lift system, and so forth.

As shown in FIG. 3, a position of the APD 180 may be defined with respect to a three-dimensional coordinate system in which an X-axis 330, Y-axis 332, and Z-axis 334 define a spatial area and provide a framework for indicating a position configuration through rotational and/or linear adjustments. While these axes are generally labeled as the X-axis, Y-axis, and Z-axis, other frameworks can be utilized to indicate the position configuration. To illustrate, aeronautical frameworks reference the axes as vertical (yaw), lateral (pitch), and longitudinal (roll) axes, while other movement frameworks reference the axes as vertical, sagittal, and frontal axes. As one example, position 336 generally points to a center position of the APD 180 that corresponds to a baseline position (e.g., position (0,0,0) using XYZ coordinates).

In aspects, the APD manager 320 communicates a rotational adjustment (e.g., rotational adjustments 338) around the X-axis 330 to the motor controller 326, where the rotational adjustment includes a rotational direction (e.g., clockwise or counterclockwise), an amount of rotation (e.g., degrees), and/or a rotation velocity. Alternatively or additionally, the APD manager 320 communicates a linear adjustment 340 along the X-axis, where the linear adjustment includes any combination of a direction, a velocity, and/or a distance of the adjustment. At times, the APD manager 320 communicates adjustments around the other axes as well, such as any combination of rotational adjustments 342 around the Y-axis 332, linear adjustments 344 along the Y-axis 332, rotational adjustments 346 around the Z-axis 334, and/or linear adjustments 348 along the Z-axis 334. Thus, the position configuration can include combinations of rotational and/or linear adjustments in all three degrees of spatial freedom. This allows the APD manager 320 to communicate physical adjustments to the APD 180. Alternatively or additionally, the APD manager communicates RIS surface configurations as further described.

Integrated Access Backhaul with an APD

Base stations communicate with one another to coordinate various types of wireless-network services, such as dual-connectivity, carrier aggregation, coordinated multipoint (CoMP), and so forth. Oftentimes, successfully coordinating these services relies on low-latency and/or high-throughput backhaul communications between the base stations (e.g., communications directed to a core network). In aspects of integrated access backhaul with an APD, a donor base station allocates air interface resources of a wireless network's spectrum (e.g., mmWave spectrum) to provide a wireless backhaul link between base stations. The donor base station and the node base station then communicate with one another using the air interface resources and various channels (e.g., PDCCH, PDCCH, PUSCH, PDSCH) associated with the wireless network. While the higher frequencies provide higher data throughput for an IAB link, channel conditions can negatively impact these techniques. To compensate for poor channel conditions, a wireless network includes an APD in a communication path between a donor base station and a node base station. The donor and node base stations, for instance, use the surface of the APD to exchange wireless signals for the IAB link. The APD allows the wireless network to improve signal quality by routing wireless signals around obstructions. This helps improve data rates, spectral efficiency, data throughput, and a reliability of communications exchanged over the IAB.

Figure 4:
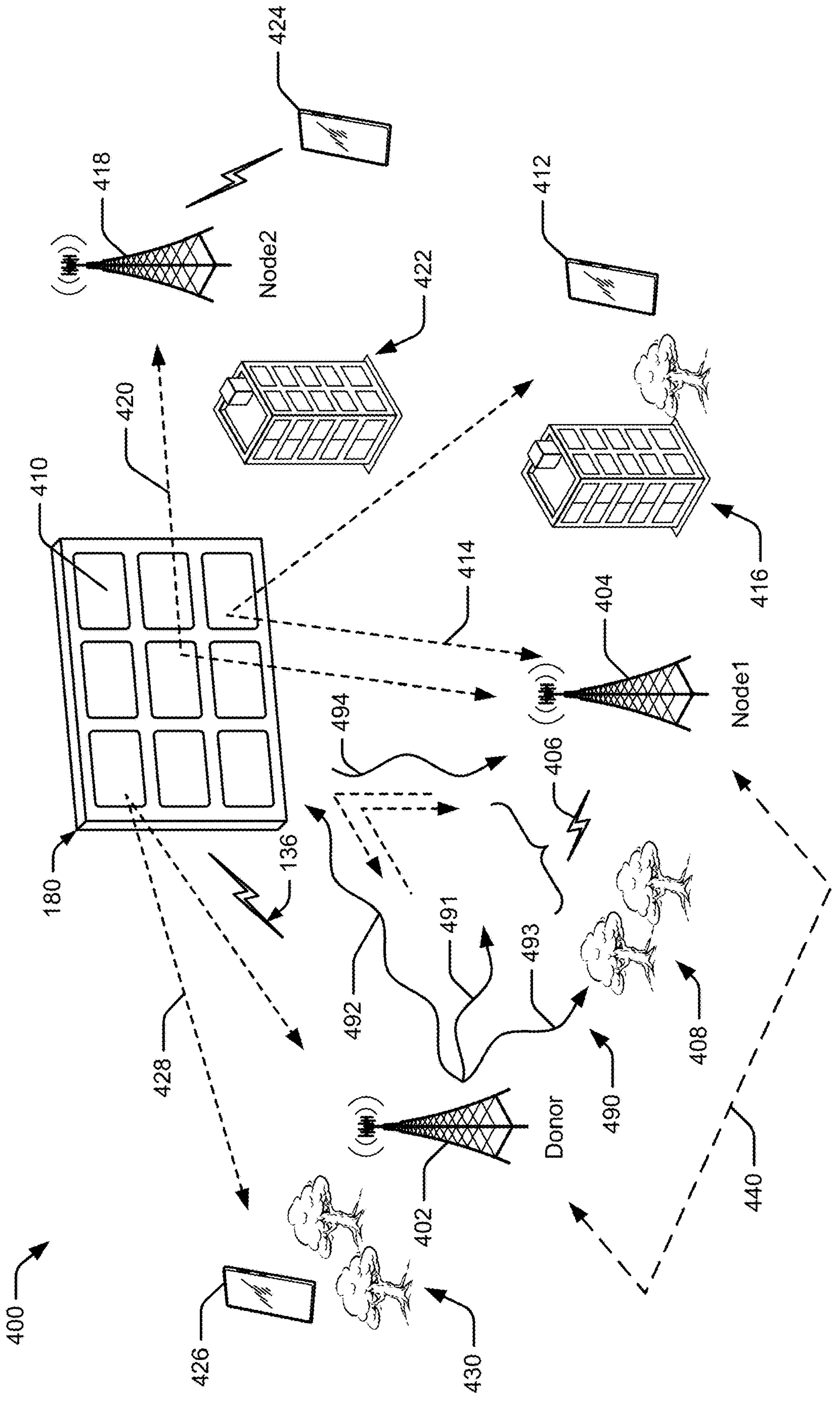
FIG. 4 illustrates an example environment in which a donor base station and at least a first node base station coordinate access to an APD in accordance with various aspects of integrated access backhaul with an APD.

FIG. 4 illustrates an example environment 400 that implements various aspects of integrated access backhaul with an APD. The environment 400 includes a donor base station 402 (also labeled "Donor"), a node base station 404 (also labeled "Node1"), and the APD 180 of FIG. 1. In aspects, the donor base station 402 and the node base station 404 represent instances of the base station 120 of FIG. 1. The donor base station 402 and the node base station communicate with one another using a wireless link 406 that is a high-band IAB link. For instance, the donor base station 402 transmits wireless signals to (and/or receives wireless signals from) the node base station 404 as part of the IAB link. In some aspects, the donor base station 402 and the node base station 404 alternatively or additionally communicate with one another using a low-band wireless link 440. To illustrate, the donor base station 402 and the node base station 404 communicate over the low-band wireless link 440 to establish the high-band IAB link (e.g., the wireless link 406) using a surface of the APD 180 as further described with reference to FIGS. 6 and 9.

In the environment 400, the donor base station 402 communicates with the node base station 404 over the high-band wireless link 406 by transmitting a wireless signal 490 to node base station 404. In the environment 400, the rays 490 are described as an omnidirectional wireless signal, but the rays 490 may form a wide beam (as shown) or a narrow beam (e.g., in a direction similar to ray 492). The wireless signal 490 includes a first signal ray 491 that propagates towards the node base station 404 in an LoS manner, a second signal ray 492 that propagates towards the APD 180, and a third signal ray 493 that propagates towards an obstruction 408 (illustrated as foliage) that blocks the signal ray 493 from reaching the node base station 404. While the donor base station 402 transmits the rays 490 to the node base station 404, the node base station 404 can also communicate with the donor base station 402 (over the wireless link 406) by transmitting wireless signals towards the donor base station and/or the APD 180 in a manner reciprocal to the rays 494 and 492 as further described. In aspects, the donor base station 402 and/or the node base station 404 transmit wireless signals to the APDs 180 in a high-frequency band that is at or above 6 GHz, such that signal rays 491, 492, and/or 493 may be blocked by obstructions (e.g., temporary LoS obstructions of signal ray 491, not shown). Individual signal rays 491, 492, and 493 of the wireless signal 490 may be transmitted simultaneously or at different times. Alternatively or additionally, the donor base station 402 and the node base station 404 communicate with one another using low-frequency communications (e.g., below 6 GHz, sub-6 GHz) that are less susceptible to obstruction-signal-degradation relative to the high-frequency communications, such as by using the low-band wireless link 440.

In various implementations, the APD 180 (or other APDs) participates in the wireless link 406 (e.g., the IAB link) between the donor base station and the node base station 404 by transforming (e.g., reflecting) waveforms using an RIS of the APD 180 with a surface configuration determined and/or indicated by the donor base station and/or the node base station. To illustrate, the signal ray 492 strikes a portion or all the surface of the APD 180, shown with a reconfigurable intelligent surface 410 (RIS 410), and transforms into the signal ray 494, which is directed toward the node base station 404. As part of receiving the wireless signal 490, the node base station 404 may receive the signal ray 491 and the signal ray 494 (but not the blocked signal ray 493).

In implementations, the donor base station 402 and/or the node base station 404 configure the RIS 410 to control how the signal ray 492 reflects from the APD 180 and transforms into the signal ray 494 directed towards the node base station. Alternatively or additionally, the RIS 410 transforms an incident signal ray from the node base station on a path reciprocal to signal ray 494 that reflects from the APD 180 and follows a path reciprocal to that of signal ray 492 to the donor base station.

In some aspects, to configure the RIS 410, the donor base station and/or the node base station select a surface configuration from a codebook and/or LUT based on signal-quality measurements, link-quality measurements, measurement reports, estimated-node-base-station location information, beam-sweeping procedures, and/or other values. For instance, assume the donor base station 402 resides at a fixed location, and the node base station 404 corresponds to a portable base station. The donor base station 402 determines an estimated location of the node base station 404, such as by analyzing the link-quality measurements on low-band or high-band communications and/or by receiving location information (e.g., GNSS information, Global Positioning System (GPS) information) from the node base station 404. The donor base station 402 may use the estimated location to select a surface configuration from the surface-configuration codebook and/or LUT. For instance, the donor base station 402 accesses historical data records that map locations to surface configurations using the estimated location of the node base station and selects a surface configuration (indicated by the historical data records) with acceptable performance levels (e.g., transforms signals to reach the estimated location of the (portable) node base station 404).

The donor base station 402 and/or the node base station 404, for example, analyze the signal- and/or link-quality measurements to identify channel impairments, such as channel impairments caused by obstructions (e.g., foliage, buildings). By way of example and not of limitation, various signal- and/or link-quality measurements that do not meet an acceptable performance level can indicate channel impairments, such as a received signal strength indicator (RSSI), power information, signal-to-interference-plus-noise ratio (SINR) information, reference signal receive power (RSRP), channel quality indicator (CQI) information, channel state information (CSI), Doppler feedback, BLock Error Rate (BLER), Quality of Service (QoS), Hybrid Automatic Repeat reQuest (HARQ) information (e.g., first transmission error rate, second transmission error rate, maximum retransmissions), uplink SINR, timing measurements, error metrics, etc. In response to identifying channel impairment(s), the donor base station 402 and/or the node base station 404 initiate a beam-sweeping procedure with the APD, such as that described in FIGS. 12 and 13, to determine a new surface configuration.

In aspects, the donor base station 402 associates a particular entry in a surface-configuration codebook with a particular node base station (e.g., the portable node base station 404) and communicates the node index to the APD 180 as described with reference to FIG. 5. The donor base station may alternatively or additionally communicate timing information with the node index to indicate when to apply the surface configuration. In some aspects, the donor base station optionally communicates, with the node index, direction information (e.g., donor-to-node direction, node-to-donor direction) that indicates which direction to reflect the transformed incident signal ray. To illustrate, assume the donor base station 402 controls a surface configuration of the APD 180 for both donor-to-node communications and node-to-donor communications as described with reference to FIGS. 8, 11, and 14. The donor base station 402 may communicate direction information with the node index such that the APD 180 (by way of the APD manager 320) selects a first surface configuration with a first reflection angle that reflects wireless signals towards the node base station 404 when indicated the donor-to-node direction information, and select a second surface configuration with a second, reciprocal reflection angle that reflects wireless signals towards the donor base station 402 when indicated node-to-donor direction information. In a similar manner, the node base station 404 may indicate a donor index associated with the donor base station 402, timing information, and/or direction information to the APD. The APD 180 uses any combination of the node index (or donor index), timing information, and/or direction information to configure the RIS 410, such as by using the node index (or donor index) to access an entry in a look-up table (LUT) and/or a surface-configuration codebook that stores surface configurations as further described.

In aspects, the wireless network associates each node index with a respective node base station such that a device (e.g., the APD, the donor base station, the node base station) can use the node index to access a respective entry in a surface-configuration codebook and/or LUT and obtain a respective surface configuration associated with the respective node base station. The respective surface configuration, when applied to the RIS 410, configures the surface of the APD to direct wireless signals to or from the respective node base station. Alternatively or additionally, the wireless network associates each donor index with a respective donor base station.

To illustrate, assume the donor base station 402 and the node base station 404 each reside at a fixed location during operation. Because the base station locations are fixed, wireless signals propagating from the donor base station to the node base station (or vice versa) repeatedly travel along the same pathways. Accordingly, the wireless network (e.g., through the donor base station, through the core network) assigns a respective node index to the node base station 404 and stores a respective surface configuration at the node-index entry that configures the RIS 410 to direct or steer wireless signals from the donor base station towards the node base station 404 in an LoS manner. To configure the RIS 410 for donor-to-node communications, the donor base station 402 may transmit the node index and/or direction information to the APD 180. The APD 180 then selects a surface configuration (using at least the node index) that configures the RIS 410 to transform the signal ray 492 to the signal ray 494 (or vice versa when the donor base station indicates a node-to-donor direction) when striking the surface of the APD 180, such as by modifying one or more desired phase characteristic(s), one or more amplitude characteristic(s), a polarization characteristic, etc. In aspects, the node base station 404 may also communicate a node index, a donor index, direction information, and so forth to the APD 180 to configure the surface for node-to-donor communications. To illustrate, the node base station may asynchronously transmit communications to the donor base station 402, such as by a sounding reference signal (SRS), and configure the surface of the APD 180 for node-to-donor communications as further described.

In various implementations, the donor base station 402 and/or the node base station 404 communicate surface-configuration information to the APD 180 over a wireless link, such as the wireless link 136 of FIG. 1. In some aspects, the donor base station configures the APD-surface of the APD 180 on behalf of the node base station, such as that described with reference to FIG. 8. The donor base station 402, for instance, apportions APD-access to the node base station 404 and determines when the node base station 404 uses the APD 180. Because the donor base station 402 determines when the node base station 404 uses the APD 180, the donor base station 402 may configure the APD surface on behalf of the node base station 404 and based on the apportioned APD-access.

In aspects, the wireless link 136 operates as an adaptive phase-changing device-slow-control channel (APD-slow-control channel), where the donor base station 402 and/or the node base station 404 transmit messages that indicate a surface configuration to the APD 180, similar to layer 2 or layer 3 control messages that communicate information using information elements (IEs). Alternatively or additionally, the wireless link 136 includes an adaptive phase-changing device-fast-control channel (APD-fast-control channel), where the donor base station 402 and/or the node base station 404 indicate control information using signaling, sometimes on a slot-by-slot basis, for quick surface-configuration changes (e.g., surface configurations applied on a slot-by-slot basis).

In some aspects, the node base station 404 uses the APD 180 to serve a UE 412, where the UE 412 represents a first instance of the UE 110 of FIG. 1. For example, assume the donor base station 402 assigns an allocation of APD-access to the node base station 404 as described with reference to FIG. 6. The node base station 404 sometimes determines to use a first portion of the allocated APD-access to communicate with the donor base station 402 through the wireless link 406 and a second portion of the allocated APD-access to maintain an access link with the UE 412 as described with reference to FIGS. 9-11. To illustrate, the node base station 404 transmits (and/or receives) wireless signals associated with the access link using the communication path 414 to compensate for an obstruction 416 that blocks LoS transmissions between the node base station 404 and the UE 412. The wireless signals following the communication path 414 strike the surface of the APD 180 and redirect to the intended recipient (e.g., the node base station 404 or the UE 412). As further described, this may occur contemporaneously with communications over the wireless link 406 (e.g., the IAB link) based on the apportioned APD-access such that the node base station 404 obtains access to the core network through the donor base station 402 to serve the UE 412.

Alternatively or additionally, the node base station 404 uses the APD 180 to serve a second node base station 418 (also labeled "Node2"), where the second node base station 418 represents an instance of the base station 120 of FIG. 1. For example, and as described with reference to FIG. 14, the node base station 404 uses a portion of the allocated APD-access (received from the donor base station 402) to establish and maintain a second (wireless) IAB link with the second node base station 418, such as in a manner similar to the access link with the UE 412. The node base station 404 establishes and maintains the second IAB link by transmitting (and receiving) wireless signals using the communication path 420 to compensate for an obstruction 422 that blocks LoS transmissions between the first node base station 404 and the second node base station 418. Based on the apportioned APD-access, the node base station 404 can also use the APD 180 to communicate with the donor base station 402 to gain access to the core network and serve the second node base station. The second node base station 418 may use the second IAB link with the node base station 404 to indirectly access the core network (e.g., through the donor base station 402 and the node base station 404) and serve a UE 424, which represents a second instance of the UE 110 of FIG. 1. Thus, the node base station 404 can utilize the APD 180 for maintaining multiple wireless communication links, such as any combination of a first IAB link with a donor base station, one or more access-links with UEs, and/or a second IAB link with a second node base station.

In some aspects, the donor base station uses the APD 180 to serve a UE 426, which represents a third instance of the generic UE 110 of FIG. 1. For example, assume the donor base station 402 assigns a first allocation of APD-access to the node base station 404 and a second allocation of APD-access to itself as the donor base station 402. In a manner similar to the node base station 404, the donor base station 402 sometimes uses a portion of its allocated APD-access to maintain an access link to the UE 426 by transmitting (and/or receiving) wireless signals that follow the communication path 428 to compensate for an obstruction 430 that blocks LoS transmissions between the donor base station 402 and the UE 426. This may occur contemporaneously with communications over the wireless link 406 (e.g., the IAB link) based on the apportioned APD-access as further described.

Figure 5:
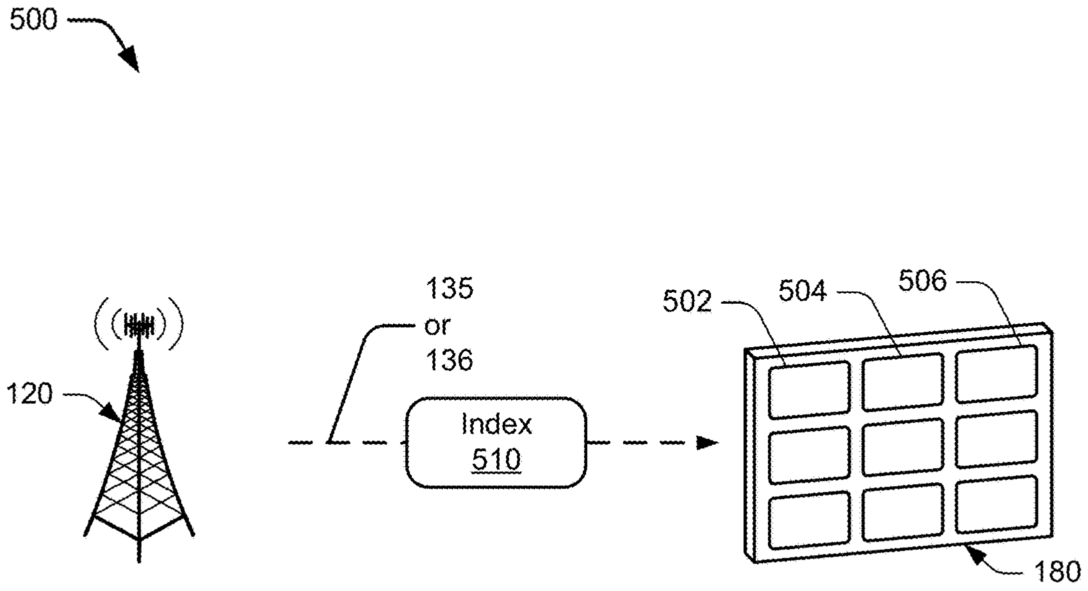
FIG. 5 illustrates an example environment in which a base station configures an APD in accordance with various aspects of integrated access backhaul with an APD.

FIG. 5 illustrates an example 500 of configuring a surface of an APD 180 in accordance with one or more aspects of integrated access backhaul with an APD. The example 500 includes instances of a base station 120 and an APD 180, which may be implemented similarly as described with reference to FIGS. 1-4. The RIS implemented by the APD 180 includes an array of "N" configurable surface elements, such as configurable surface element 502, configurable surface element 504, configurable surface element 506, and so forth, where "N" represents the number of configurable surface elements of the RIS.

In implementations, the base station 120 manages a configuration of the RIS of the APD 180 through use of a surface-configuration codebook 508, which can be preconfigured and/or known by the base station 120 and the APD 180. In some cases, the base station 120 transmits a surface-configuration codebook 508 and/or a beam-sweeping codebook using the wireless link 136 and/or the wireless link 137, such as over an APD-slow-control channel using one or more messages. In aspects, the base station 120 uses the APD-slow-control channel to communicate large quantities of data, to communicate data without low-latency requirements, and/or to communicate data without timing requirements. At times, the base station 120 transmits multiple surface-configuration codebooks to the APD 180, such as a phase-vector codebook, a beam-sweeping codebook, or the like. In response, the APD 180 stores the surface-configuration codebook(s) 508 and/or other codebooks in CRM, which is representative of codebook(s) 316 in CRM 312 as described with reference to FIG. 3. Alternatively or additionally, the APD 180 obtains the surface-configuration and other codebooks through manufacturing (e.g., programming), calibration, or installation processes that store the surface-configuration codebook(s) 508 and other codebooks in the CRM 312 of the APD 180 during assembly, installation, calibration, verification, or through an operator manually adding or updating the codebook(s).

The surface-configuration codebook 508 includes configuration information that specifies a surface configuration for some or all of the configurable surface elements (e.g., elements 324) forming the RIS of the APD 180. As one example, each index of the code book corresponds to a phase vector with configuration information for each configurable surface element of the APD 180. Index 0, for instance, maps phase configuration 0 to configurable surface element 502, phase configuration 1 to configurable surface element 504, phase configuration 2 to configurable surface element 506, and so forth. Similarly, index 1 maps phase configuration 3 to configurable surface element 502, phase configuration 4 to configurable surface element 504, phase configuration 5 to configurable surface element 506, and so forth. The surface-configuration codebook 508 can include any number of phase vectors that specify configurations for any number of configurable surface elements such that a first phase vector corresponds to a first surface-configuration for the APD 180 (by way of configurations for each configurable surface element in the RIS), a second phase-vector corresponds to a second surface configuration for the APD 180, and so on. Alternatively or additionally, the codebook 508 can specify phase vectors that configure a subset of configurable surface elements. In aspects, one or more surface configurations or phase vectors may be mapped or calibrated to specific angle information of incident and/or reflective wireless signals (e.g., reference signals), signal rays, beamformed transmission of the base station 120, or the like.

While the surface-configuration codebook 508 of FIG. 5 includes phase vector information, alternative or additional codebooks store beam configuration information, such as a first surface configuration that specifies a first beam with a first (propagation) direction, a second surface configuration that specifies a second beam with a second direction, and so on. Thus, in various implementations, the surface-configuration codebook 508 corresponds to a beam-codebook, which may enable the APD 180 to implement beamforming of incident wireless signals. Similarly, to configure the surface of the APD 180, the base station 120 determines the desired beam configuration for the transformed signal and identifies an entry in the beam-codebook corresponding to the desired beam configuration. In some aspects, a beam-sweeping codebook indicates a pattern of surface configurations and/or beam configurations, such as surface configurations and/or beam configurations, as indicated by the surface-configuration codebook 508 and beam configurations specified by the beam-codebook. To illustrate, the beam-sweeping codebook indicates an order of surface configurations and optionally APD reflection identifiers to cycle through in order to beam sweep in a horizontal direction or vertical direction. Alternatively or additionally, the beam-sweeping codebook indicates a time duration for applying each surface configuration effective to steer a reflected beam in a specific direction for the duration of time.

The surface-configuration information stored in a codebook can correspond to a full configuration that specifies an exact or absolute configuration (e.g., configure with this value) or a delta configuration that specifies a relative configuration (e.g., modify a current state by this value). In one or more implementations, the phase configuration information specifies a directional increment and/or angular adjustment between an incident signal and a transformed signal. For instance, the phase configuration 0 can specify an angular adjustment configuration for element 502 such that the configurable surface element 502 reflects the incident waveform with a "phase configuration 0" relative angular or directional shift. As shown in FIG. 5, the base station 120 and/or the UE 110 communicate an indication to the APD 180 that specifies a surface configuration. In the present example, the indication specifies an index 510 (index 510) that maps to a corresponding surface configuration of the APD 180. In some aspects, the index 510 represents a node index, a donor index, a beam-sweeping index, or a surface-configuration index, each of which can map to an entry in a surface-configuration codebook. In response to receiving the indication, the APD manager 320 retrieves the surface configuration from the surface-configuration codebook 508 using the index and applies the surface configuration to the RIS. For example, the APD manager 320 configures each configurable surface element (or each configurable surface element of a subset of configurable surface elements) as specified by a respective entry in the surface-configuration codebook 508.

In various implementations, the base station 120 communicates timing information (not shown) to the APD 180, which may be included with a surface configuration or beam-sweeping index. For instance, the base station 120 sometimes indicates, to the APD 180 and using the wireless link 136 or 137, respectively, a start time for the application of an indicated surface configuration or beam-sweeping pattern. This can include indicating static timing information (e.g., periodic) and/or dynamic timing information (e.g., one-time use). In aspects, the base station 120 communicates a stop time that indicates when to remove and/or change the surface configuration or beam-sweeping pattern. In changing the surface configuration, the APD 180, by way of the APD manager 320, can apply a default surface configuration, return to a previous surface configuration (e.g., a surface configuration used prior to the indicated surface configuration), and/or apply a new surface configuration to control a direction in which the APD 180 reflects wireless signals. To maintain synchronized timing, the APD 180 can receive and/or process a base station synchronizing signal.

By specifying the timing information, the base station 120 can use time-partitioning to apportion access to the APD 180. Alternatively or additionally, the base station 120 can use configurable-surface-element partitioning to apportion access to the APD 180. As one example, a donor base station shares access to the APD 180 with a node base station as described with reference to FIGS. 6-8. As another example, as described with reference to FIGS. 9-11, a node base station shares access to the APD 180 to communicate with a donor base station over an JAB link and to communicate with a UE over an access link. Alternatively or additionally, the node base station shares access to the APD 180 to communicate with (and serve) a second node base station over a second JAB link as described with reference to FIG. 14. At times, the base station 120 updates a one or more entries in the surface configuration codebook as described with reference to FIGS. 12 and 13.

Signaling and Control Transactions for Integrated Access Backhaul with an APD FIGS. 6, 7, 8, 9, 10, 11, 12, 13, and 14 illustrate example signaling and control transaction diagrams in accordance with one or more aspects of integrated access backhaul with an APD. In aspects, operations of the signaling and control transactions may be performed by any combination of devices, including a donor base station (e.g., the donor base station 121, the donor base station 402), a first node base station (e.g., the node base station 122, the node base station 404), an APD (e.g., the APD 180), a UE (e.g., the UE 110, the UE 412, the UE 424, the UE 426), and/or a second node base station (e.g., the node base station 418) using aspects as described with reference to any of FIGS. 1-5.

Figure 6:
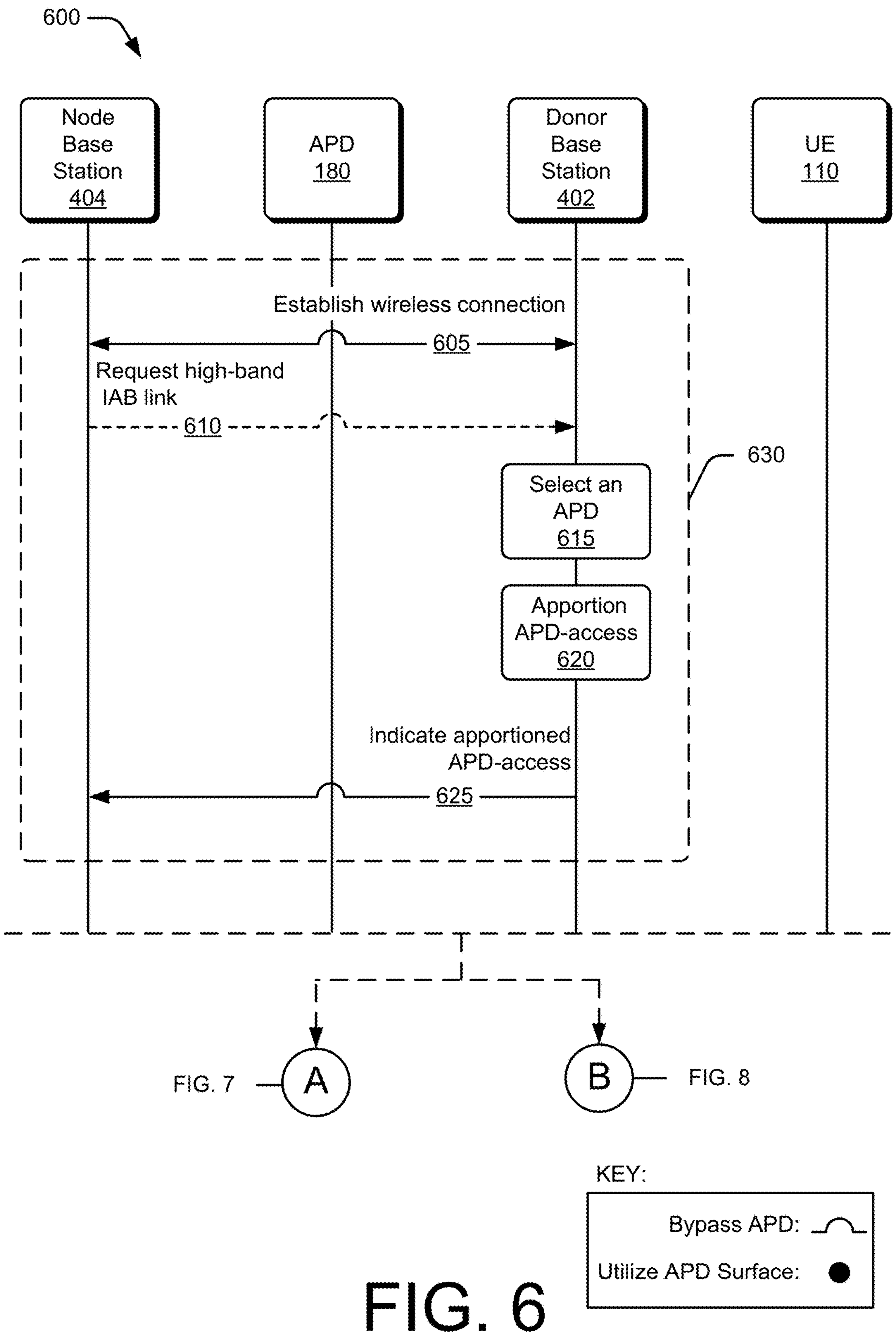
FIG. 6 illustrates an example transaction diagram between various network entities in accordance with various aspects of integrated access backhaul with an APD.
Figure 7:
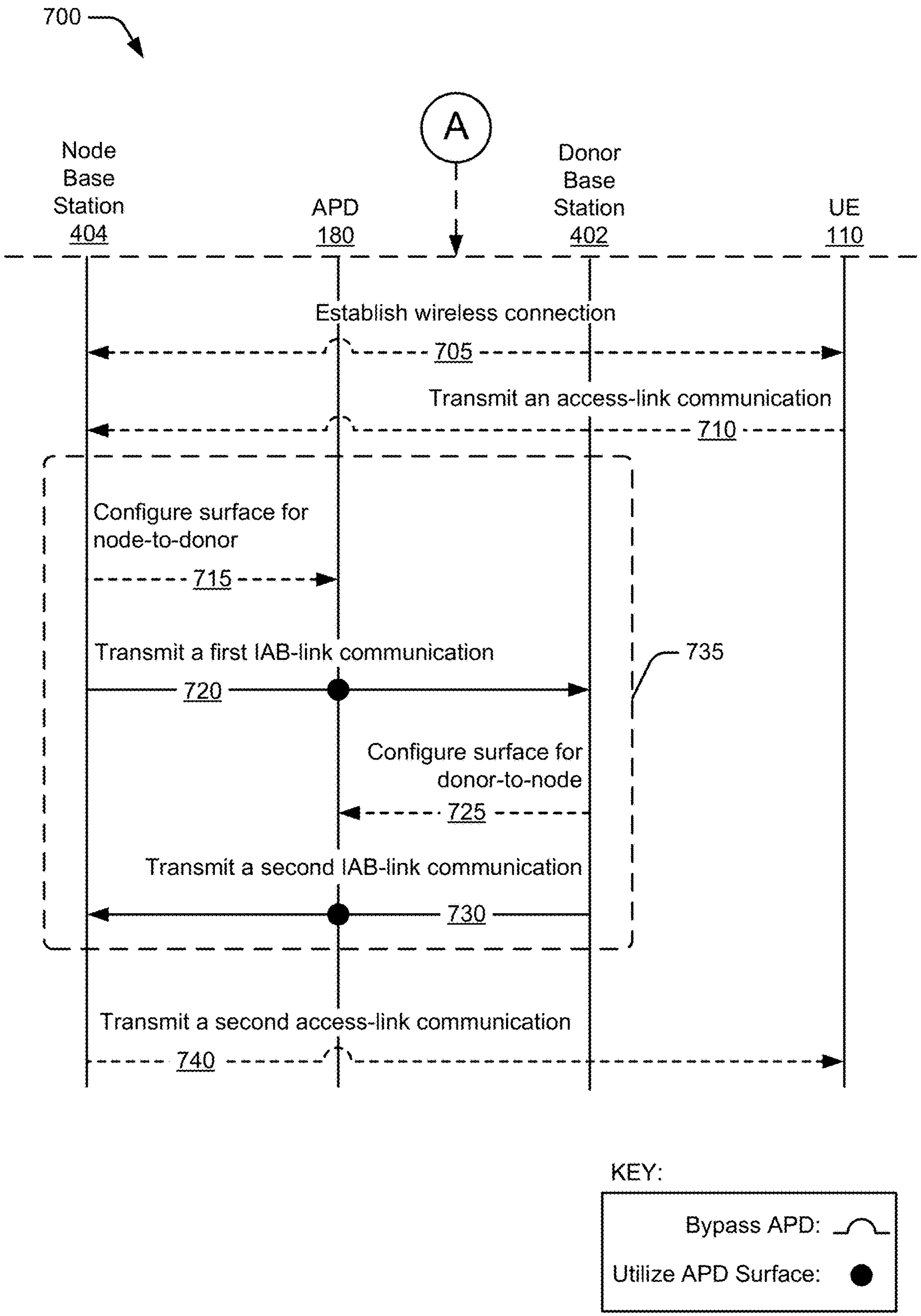
FIG. 7 continues from FIG. 6 and illustrates an example transaction diagram in which a node base station configures an APD surface in accordance with various aspects of integrated access backhaul with an APD.
Figure 8:
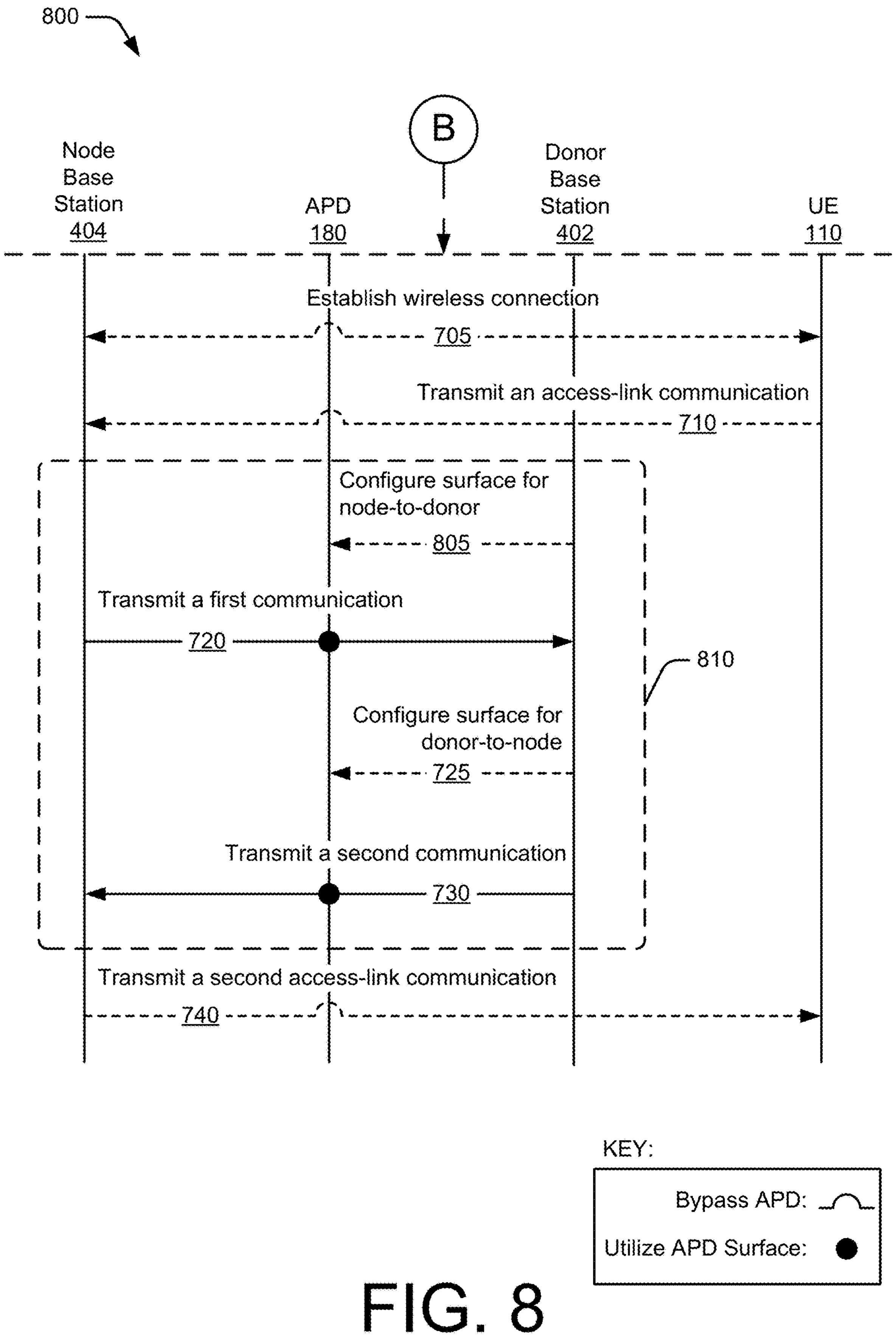
FIG. 8 continues from FIG. 6 and illustrates an example transaction diagram in which a donor base station controls an APD surface on behalf of a node base station in accordance with various aspects of integrated access backhaul with an APD.

A first example of signaling and control transactions for integrated access backhaul with an APD is illustrated by the signaling and control transaction diagram 600 of FIG. 6, where the diagram 600 leads to (a) additional signaling and control transactions as illustrated by FIG. 7, or (b) additional signaling and control transactions as illustrated by FIG. 8. The diagram 600 includes signaling and control transactions among the node base station 404, the APD 180, the donor base station 402, and the UE 110. Collectively, FIGS. 6-8 illustrate example implementations in which a donor base station and a node base station communicate over an IAB link (e.g., wireless link 406) using the surface of an APD. In some aspects, the node base station uses the IAB link with the donor base station to serve the UE 110 without using the APD in a communication path (e.g., communication path 414) to the UE.

As illustrated, at 605, the node base station 404 and the donor base station 402 establish a wireless connection with one another. To illustrate, the node base station 404 and the donor base station 402 initially establish the wireless connection using low-band communications (e.g., the low-band wireless link 440). For instance, the node base station 404 may identify that high-band communications (e.g., mmWave) with the donor base station 402 have poor quality (and/or the donor base station 402 identifies that high-band communications have poor quality), such as by analyzing signal- or link-quality measurements associated with high-band communications and determining that the measurements have fallen below an acceptable performance threshold. Alternatively or additionally, the node base station 404 fails to receive a response from the donor base station 402 when transmitting high-band IAB communications (or vice versa). In response to identifying that the high-band communications have poor quality and/or failing to receive a response, the node base station 404 and/or the donor base station 402 determine to establish a wireless low-band connection (e.g., the low-band wireless link 440) with the other base station.

In some aspects, the node base station 404 indicates location information to the donor base station 402 using the low-band connection (e.g., low-band wireless link 440), such as by transmitting GNSS and/or GPS location information to the donor base station. In establishing the wireless low-band connection, the node base station 404 and the donor base station 402 bypass the surface of the APD insofar as neither base station actively configures the surface of the APD or transmits signals towards the surface of the APD with an intent of reflecting and/or redirecting the wireless signals as further described.

At 610, the node base station 404 optionally requests a high-band IAB link from the donor base station 402, such as an IAB link implemented using mmWave resources of a RAT (e.g., 5G). The node base station 404, as one example, transmits the request to the donor base station 402 after establishing a low-band connection at 605. Similar to that described at 605, the node base station 404 bypasses the APD in transmitting the request (e.g., does not actively configure the surface of the APD, does not intentionally reflect signals of the surface of the APD). In some aspects, the node base station 404 indicates a request to include an APD in a communication path between the donor base station and the node base station, such as implicitly requesting an APD by forwarding the signal- or link-quality measurements associated with high-band communications or explicitly with a Boolean value, a field value, or an enumerated type. However, in alternative or additional aspects, the donor base station 402 determines to establish the high-band IAB link without receiving the request from the node base station 404. In aspects, the donor base station 402 analyzes the signal- or link-quality measurements, either received from the node base station over the low-band connection or generated by the donor base station from high-band communications, and determines the measurements indicate a channel impairment. In response to identifying the channel impairment, the donor base station 402 determines to include an APD in the high-band communication path with the node base station 404.

At 615, the donor base station 402 selects an APD to use for establishing and/or maintaining the (high-band, wireless) IAB link (e.g., wireless link 406) with the node base station 404. To select the APD, the donor base station 402 may identify one or more APDs within operating range, such as by monitoring for an APD-broadcast signal and/or message emitted from the APD(s) that announces a presence of the APD to the donor base station. Alternatively or additionally, the donor base station 402 may access APD records that indicate the APDs within a cell service area or queries a server that stores information regarding APDs within the cell service area. The donor base station 402 uses location information received from the node base station 404 over a low-band communication (or obtained using a beam-sweeping procedure) and identifies APDs within operating range for both the donor base station 402 and the node base station 404. In some aspects, the donor base station 402 analyzes the APD capabilities of each candidate APD (e.g., a number of configurable surface elements, a configuration bit-resolution for the configurable surface elements, supported surface-configuration codebooks, APD-surface sharing capabilities) and selects the APD 180 based on the APD capabilities. The donor base station, for instance, selects an APD that supports surface sharing. As other examples, the donor base station may select the APD in the candidate APDs that includes the highest number of configurable surface elements, has the largest configurable surface area, or has surface angle capabilities best suited to reach the node base station.

Figure 12:
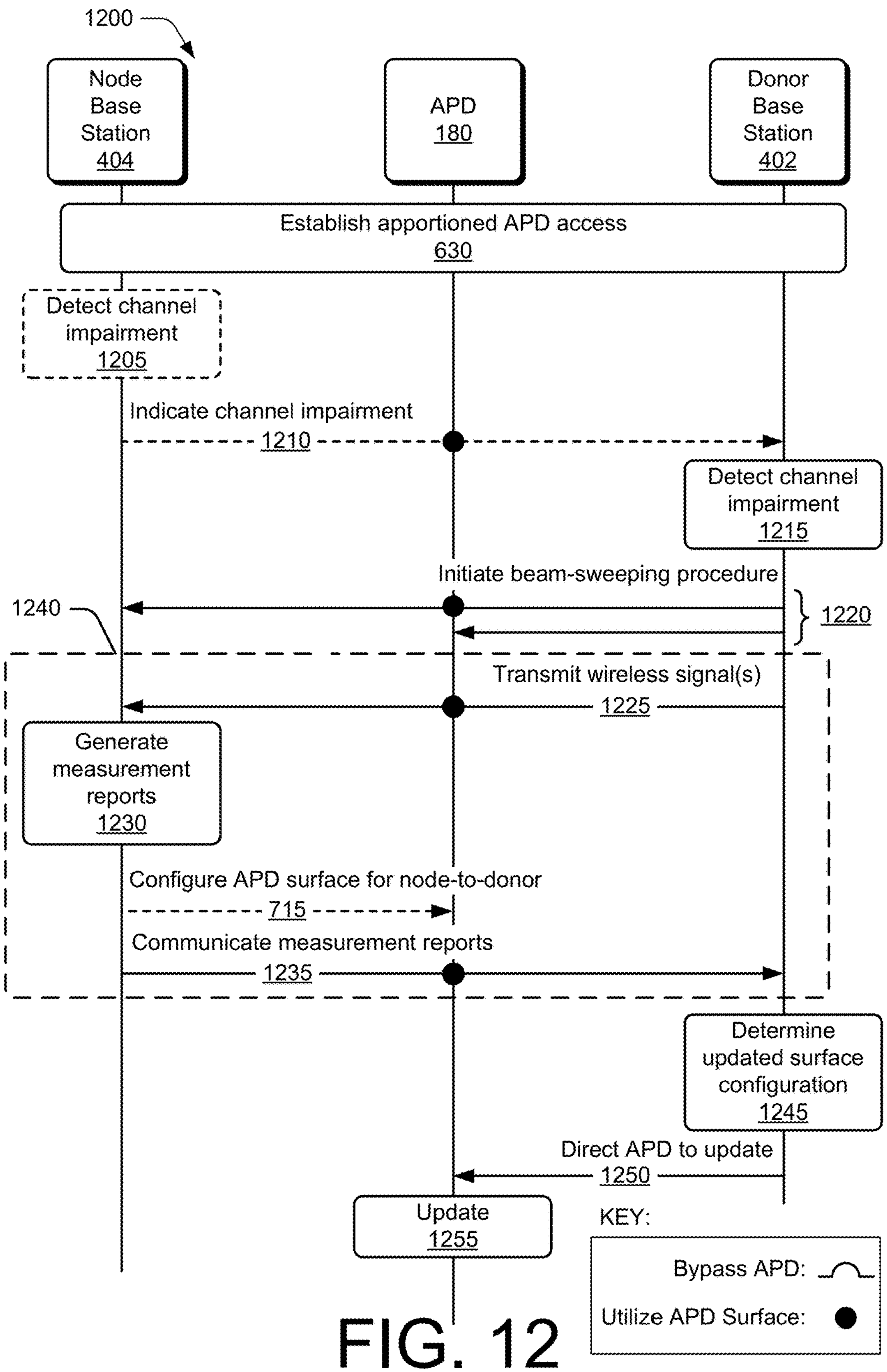
FIG. 12 illustrates an example transaction diagram between various network entities that perform a beam-sweeping procedure in accordance with various aspects of integrated access backhaul with an APD.
Figure 13:
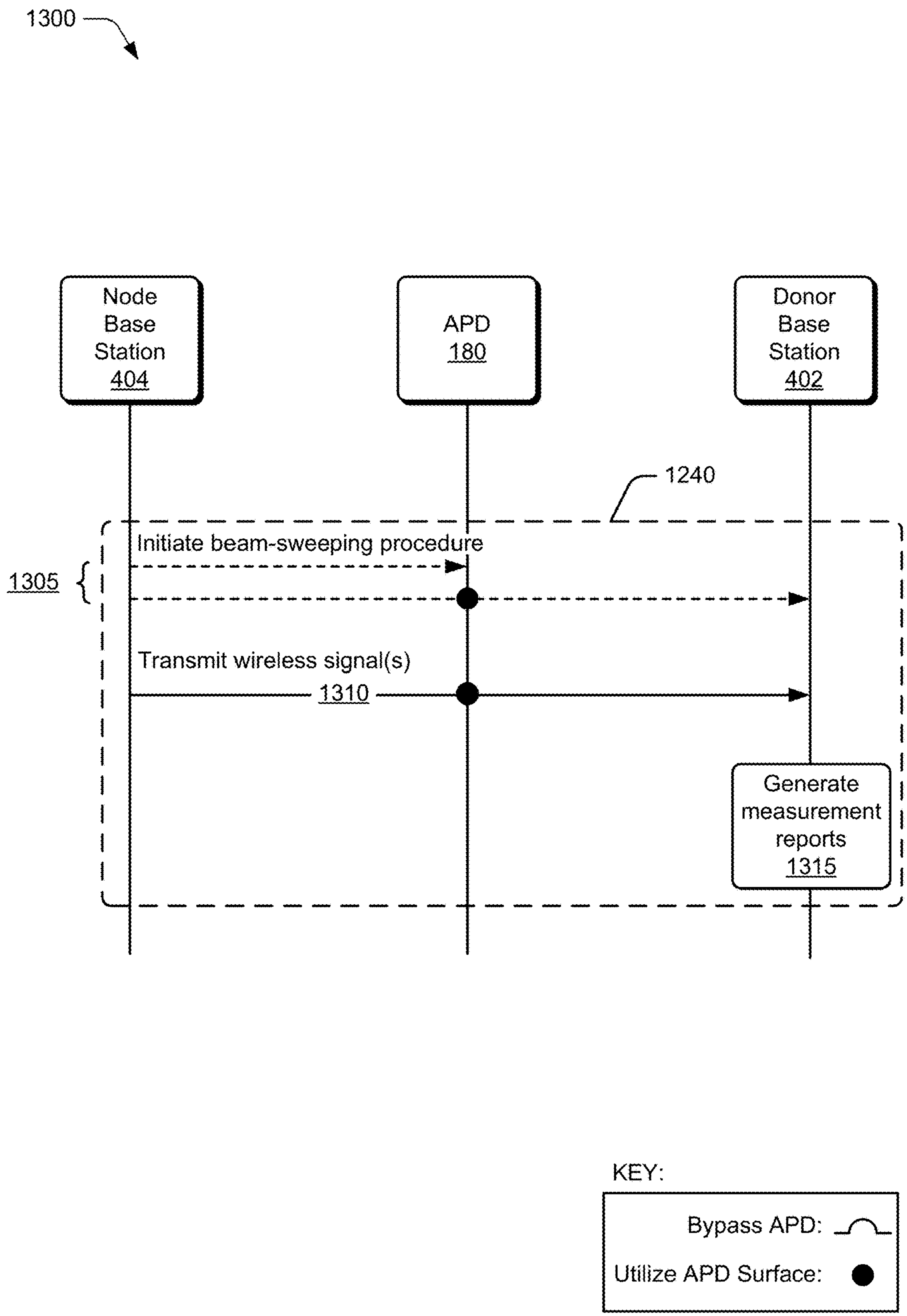
FIG. 13 illustrates an example transaction diagram between various network entities that perform an alternative or additional beam-sweeping procedure in accordance with various aspects of integrated access backhaul with an APD.

Alternatively or additionally, the donor base station 402 performs a beam-sweeping procedure to identify a wireless high-band communication path to the node base station, such as a beam-sweeping procedure similar to that described at 1225 of FIGS. 12 and 13, and/or uses low-band communications to communicate/receive feedback (e.g., measurement reports). For example, assume the node base station 404 receives input that identifies the location of the APD 180 and the donor base station 402, such as through a network operator manually configuring a portable node base station and inputting the APD-location information and/or the donor base station-location information. In aspects, the node base station 404 transmits a message to the donor base station 402, such as by transmitting a message using low-band communications (e.g., the low-band wireless link 440) and/or by directing transmissions towards a surface of the APD 180 based on the APD-location information. The message may or may not include location information for the node base station 404. In response to the receiving the message, the donor base station 402 performs the beam-sweeping procedure to identify a surface configuration for the APD that improves communications with the node base station 404, such as by using the beam-sweeping procedure to identify an incident angle and reflection angle that results in a high-band wireless signal with better signal quality at the receiving device.

At 620, the donor base station 402 apportions and assigns APD-access to the node base station 404. To illustrate, the donor base station 402 apportions reflection-access to the APD 180 using time partitioning and assigns a first time-duration to the node base station 404 and/or a second time-duration to itself as the donor base station 402. This can include statically assigning the time-durations (e.g., a periodic basis) or dynamically assigning the time durations (e.g., one-time use). Based on the time-partitioned access, the node base station 404 agrees to use (and/or configure) the surface of the APD 180 during the first time-duration and refrain from using (and/or configuring) the surface of the APD 180 during the second time-duration. The time divisions determined by the donor base station do not have to be equal and may depend on various factors, such as the number of node base stations being served (directly or indirectly) by the donor base station, the number of UEs being served (directly or indirectly) by the node base station, and so forth.

Alternatively or additionally, the donor base station 402 apportions reflection-access to the APD 180 using configurable-surface-element partitioning, such as by apportioning subsets of configurable surface elements that form the RIS. For example, with reference to FIG. 5, the base station 120 apportions the configurable surface element 502 to the node base station 404 and the configurable surface element 506 to the donor base station 402. This can include any type of configurable-surface-element partitioning, such as horizontal partitioning that groups elements in a same horizontal row, vertical partitioning that groups elements in a same vertical column, quadrant partitioning, and so forth. The configurable-surface-element partitions do not have to be equal and may depend on various factors, such as the number of node base stations being served (directly or indirectly) by the donor base station, the number of UEs being served (directly or indirectly) by the node base station, and so forth.

As part of apportioning APD-access to the APD 180, the donor base station 402 sometimes apportions control-access to the APD. The donor base station 402, for instance, apportions physical resources of an APD-control channel (e.g., wireless link 136 of FIG. 1), such as when the APD 180 only supports a single physical APD-control channel instead of multiple physical APD-control channels. A single physical APD-control channel, however, may support receipt of APD-control messages directly from different devices (e.g., a donor base station, a node base station). The donor base station 402, for instance, assigns a first resource block of the APD-control channel to the node base station 404 and a second resource block of the APD-control channel to the donor base station 402. Alternatively or additionally, the donor base station 402 assigns a first control channel element (CCE) (e.g., resource element (RE), resource element group (REG)) to the donor base station 402 and a second CCE to the node base station 404. As another example, the donor base station 402 assigns a first time slot of the shared APD-control channel to the donor base station and a second time slot of the APD-control channel to node base station 404. When sharing an APD-control channel, the base stations may include a device identifier in APD-control messages. Alternatively, the donor base station 402 assigns a particular APD-control channel (out of multiple APD-control channels) to the node base station 404. However, other forms of partitioning can be utilized as well, such as coding-scheme-partitioning that assigns one of several coding schemes (e.g., orthogonal codes used to encode communications over the APD-control channels) and/or frequency-partitioning that assigns different frequency (sub)-bands of the APD-control channel to different entities.

At 625, the donor base station 402 indicates the apportioned APD-access to the node base station 404. This can include indicating any combination of apportioned reflection-access and/or apportioned control-access determined at 620.

The diagram 600 illustrates the donor base station indicating the apportioned APD-access using low-band communications (e.g., the low-band wireless link 440) that bypass the APD as further described. However, in alternative implementations, the donor base station can utilize the APD to indicate the apportioned APD-access to the node base station 404, such as by configuring the surface of the APD for donor-to-node communications as described at 725 of FIG. 7 and transmitting wireless signals towards the surface of the APD 180 as described at 730 of FIG. 7.

Generally, the transactions 605, 610, 615, 620, and 625 correspond to a sub-diagram 630 in which the donor base station 402 and the node base station 404 establish apportioned APD access. The sub-diagram 630 can include alternative or additional transactions not illustrated for visual brevity.

At this point, the diagram 600 can proceed to at least two alternative paths: option "A" (described in FIG. 7) or option "B" (described in FIG. 8). FIG. 7 depicts a signaling and control transaction diagram 700 in which a node base station communicates a surface configuration to an APD directly over an APD-control channel. FIG. 8 depicts a signaling and control transaction diagram 800 in which a donor base station configures the surface of the APD on behalf of the node base station.

FIG. 7 continues to option "A" where, at 705, the node base station 404 optionally establishes a wireless connection with the UE 110. As one example, as described with reference to FIG. 1, the node base station 404 transmits wireless signals to (and/or receives wireless signals from) the UE, such as by transmitting/receiving mmWaves generally in an LoS manner with the UE 110 and without including the APD 180 in the communication path (e.g., the wireless link 134 of FIG. 1). In other words, the node base station 404 and the UE 110 exchange the wireless signals without using the surface of the APD (e.g., high band communications that bypass the APD, low-band communications). In alternative implementations, such as those described with reference to FIGS. 9-11, the node base station 404 includes the APD 180 in the communication path with the UE 110 (e.g., the communication path 414 of FIG. 4). In some aspects, the node base station 404 and the UE 110 establish a wireless connection by performing various procedures, such as by a radio resource control (RRC) Connection Setup procedure to establish a wireless link.

At 710, the UE 110 optionally transmits a first access-link communication to the node base station 404, such as control-plane information and/or user-plane data. To illustrate, assume the UE 110 transmits a registration request to the node base station 404. In response to receiving the registration request, the node base station 404 initiates communications with the core network by way of the donor base station 402 and using the IAB link and the APD 180. However, in alternative implementations, the node base station 404 determines to communicate with the donor base station 402 without being triggered by a request from the UE 110. As one example, the node base station 404 detects poor signal quality and/or channel impairments in the IAB link and determines to indicate the poor signal quality and/or channel impairments to the donor base station 402.

At 715, the node base station 404 configures the surface of the APD 180 for node-to-donor communications which, at times can be optional, such as when the node base station 404 indicates periodic timing information and/or when the node base station configures a subset of configurable surface elements allocated to the node base station 404 without time restrictions (e.g., the node base station has continual access). The node base station 404, for instance, communicates the surface configuration to the APD 180 using apportioned control-access to an APD-control channel (and indicated to the node base station 404 at 625 of FIG. 6). In aspects, the node base station 404 communicates a donor index that identifies the donor base station 402 for the desired APD configuration or the node base station 404 communicates a node index for the desired APD configuration and direction information as further described. The node base station 404 may indicate timing information, such as a time duration and periodic time information such that the APD 180 repeatedly and periodically applies the surface configuration to the RIS corresponding to the index without further directions. Thus, the node base station 404 may indicate periodic time information to the APD 180 once and refrain from configuring the surface of the APD when transmitting subsequent node-to-donor communications until a trigger event occurs (e.g., identifying a channel impairment, a change in location). Alternatively or additionally, the node base station 404 may configure a subset of configurable surface elements allocated to the node base station 404 once and refrain from reconfiguring the APD-surface until the trigger event occurs. At times, and in a manner similar to indicating a donor or node index, the node base station 404 analyzes signal- and/or link-quality measurements on wireless signals received from the donor base station 402 (e.g., at 625 of FIG. 6), selects a surface configuration from the surface configuration codebook, and indicates a surface-configuration index to the APD 180.

At 720, the node base station 404 transmits a first IAB-link communication to the donor base station 402 using the IAB link and by transmitting wireless signals (e.g., mmWaves) towards the surface of the APD 180 as further described. To illustrate, the node base station 404 transmits control-plane information to the donor base station 402 associated with the IAB link, control-plane information associated with the access-link to the UE, and/or user-plane data associated with the access-link to the UE. For instance, the node base station 404 transmits wireless signals towards the surface of the APD 180 based on the apportioned reflection-access (e.g., time-partitioned reflection-access, configurable-surface-element partitioning). In some aspects, the first IAB-link communication corresponds to a request from the UE 110, while in other aspects, the node base station 404 may transmit a communication unrelated to access-link communications with a UE, such as a sounding reference signal (SRS) and/or control-plane information associated with the IAB link as further described.

At 725, the donor base station 402 configures the surface of the APD 180 for donor-to-node communications, which, at times, can be optional, such as when the donor base station 402 indicates periodic timing information. Similar to the node base station 404, the donor base station may use communicate a surface configuration to the APD 180 using apportioned control-access to an APD-control channel, such as by communicating any combination of a node index, direction information, and/or timing information. Alternatively or additionally, the donor base station 402 analyzes signal- and/or link-quality measurements on wireless signals received from the node base station 404, selects a surface configuration from the surface configuration codebook, and indicates a surface-configuration index to the APD 180. In aspects, the donor base station 402 indicates periodic timing information that directs the APD 180 to repeatedly and periodically applies the corresponding surface configuration to the RIS without further directions. Thus, the donor base station may indicate periodic timing information with a surface configuration once and refrain from configuring the surface of the APD when transmitting subsequent donor-to-node communications. Alternatively or additionally, the donor base station 402 indicates the surface configuration to the APD 180 prior to each donor-to-node transmission.

At 730, the donor base station 402 transmits a second IAB-link communication to the node base station using the IAB link and by transmitting wireless signals (e.g., mmWaves) towards the surface of the APD 180. For instance, the donor base station 402 transmits wireless signals towards the surface of the APD 180 based on the apportioned reflection-access (e.g., time-partitioned reflection-access, configurable-surface-element partitioning) allocated to the donor base station 402. In some aspects, the second IAB-link communication corresponds to a request from the UE 110 such that the donor base station 402 serves the node base station 404 with access to the core network. Alternatively or additionally, the communication transmitted by the donor base station 402 is unrelated to access-link communications with a UE. Accordingly, at 740, the node base station optionally transmits a second access-link communication to the UE 110.

Generally, the transactions 715, 720, 725, and 730 correspond to a sub-diagram 735 in which a donor base station serves a node base station, and the node base station controls a surface configuration of the APD. The sub-diagram 730 can include alternative or additional transactions not illustrated for visual brevity. Further, while the transactions in the sub-diagram 735 illustrate the donor base station 402 responding to a first IAB-link communication initiated by the node base station 404, in other aspects, the donor base station 402 initiates the IAB-link communications (e.g., without receiving the first IAB-link communication from the node base station 404). To illustrate, the donor base station 402 may initiate transmitting control-plane information associated with the IAB link (e.g., wireless link 406) to the node base station 404.

FIG. 8 depicts the signaling and control transaction diagram 800 in which a donor base station configures an APD-surface on behalf of a node base station. Returning to the completion of the diagram 600 of FIG. 6, the diagram can proceed alternatively to option "B," which is described in FIG. 8. At 705, the node base station 404 and the UE 110 optionally establish a wireless connection, and at 710, the UE optionally communicates a first access-link communication to the node base station.

At 805, the donor base station 402 configures the surface of the APD 180 for node-to-donor communications, which, at times, can be optional, such as when the donor base station 402 indicates periodic timing information and/or when the donor base station configures a subset of configurable surface elements that are allocated to the node base station 404 without time-partitioned APD-access. Because the donor base station 402 determines when the node base station 404 uses the APD 180, the donor base station 402 can synchronize and/or configure the APD surface based on the apportioned APD-access assigned to the node base station. When the donor base station 402 configures the APD surface, the donor base station may indicate periodic timing information with a surface configuration once and refrain from configuring the surface of the APD when transmitting subsequent donor-to-node communications until a trigger event occurs (e.g., identifying a channel impairment, a change in location). As another example, the donor base station 402 may configure a subset of configurable surface elements allocated to the node base station 404 (without time restrictions) once and refrain from reconfiguring the surface until the trigger event occurs. Alternatively or additionally, the donor base station 402 indicates the surface configuration prior to each scheduled node base station transmission. The donor base station 402 may indicate a node index and/or a direction to configure the surface of the APD 180.

Accordingly, at 720, the node base station 404 transmits a first IAB-link communication to the donor base station 402 using the IAB link (e.g., wireless link 406), where the node base station sends the IAB-link communication based on the apportioned reflection-access (e.g., time partitioned, configurable-surface-element partitioned). As one example, the node base station 404 directs the transmissions towards a subset of configurable surface elements and/or transmits during a first time-duration allocated to the node base station. By allowing the donor base station to configure the APD surface, the node base station 404 can communicate with the donor base station 402 using the surface of the APD 180 and without directly communicating with the APD 180 to control the surface configuration. In turn, this provides the donor base station with more control over the APD configuration.

At 725, the donor base station 402 configures the surface of the APD 180 for donor-to-node communications, which, as further described, can be optional (e.g., when the donor base station previously indicated periodic timing information or configured a portion of the APD-surface). At 730, the donor base station 402 transmits a second IAB-link communication to the node base station 404 using the IAB link and the surface of the APD. In some aspects, the second IAB-link communication corresponds to the first access-link communication associated with the UE 110. Alternatively, the second IAB-link communication is unrelated to access-link communications with the UE, such as a sounding reference signal (SRS) and/or control-plane information associated with the IAB link. Accordingly, at 740, the node base station optionally communicates a second access-link communication to the UE 110.

Generally, the transactions 805, 720, 725, and 730 correspond to a sub-diagram 810 in which a donor base station serves a node base station, and the donor base station controls a surface configuration of the APD. The sub-diagram 810 can include alternative or additional transactions not illustrated for visual brevity. Similar to that described with reference to the sub-diagram 735, the donor base station 402 may alternatively initiate the IAB-link communications with the node base station 404, such as by transmitting control-plane information associated with the IAB link to the node base station 404.

Figure 9:
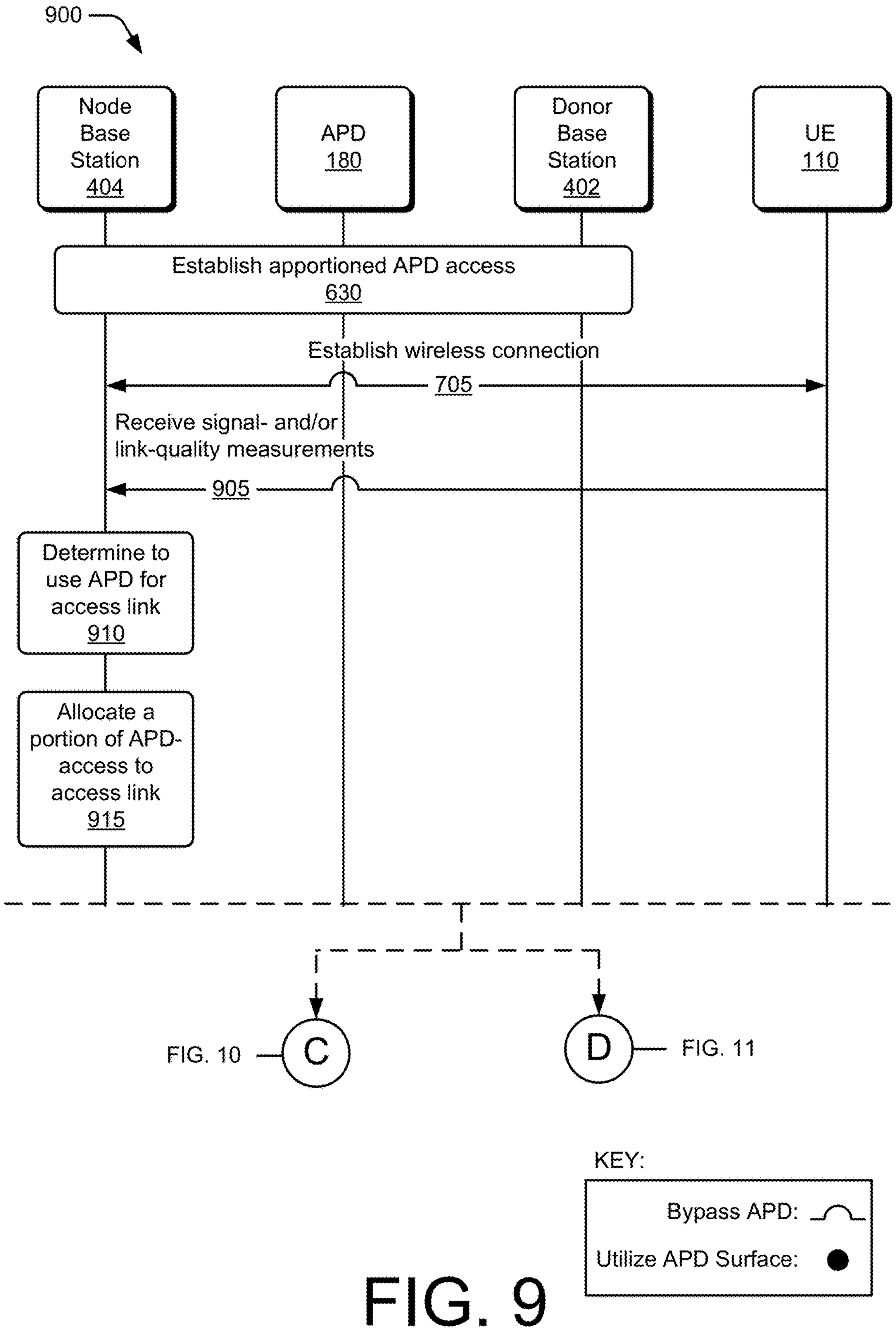
FIG. 9 illustrates an example transaction diagram between various network entities in accordance with various aspects of integrated access backhaul with an APD.
Figure 10:
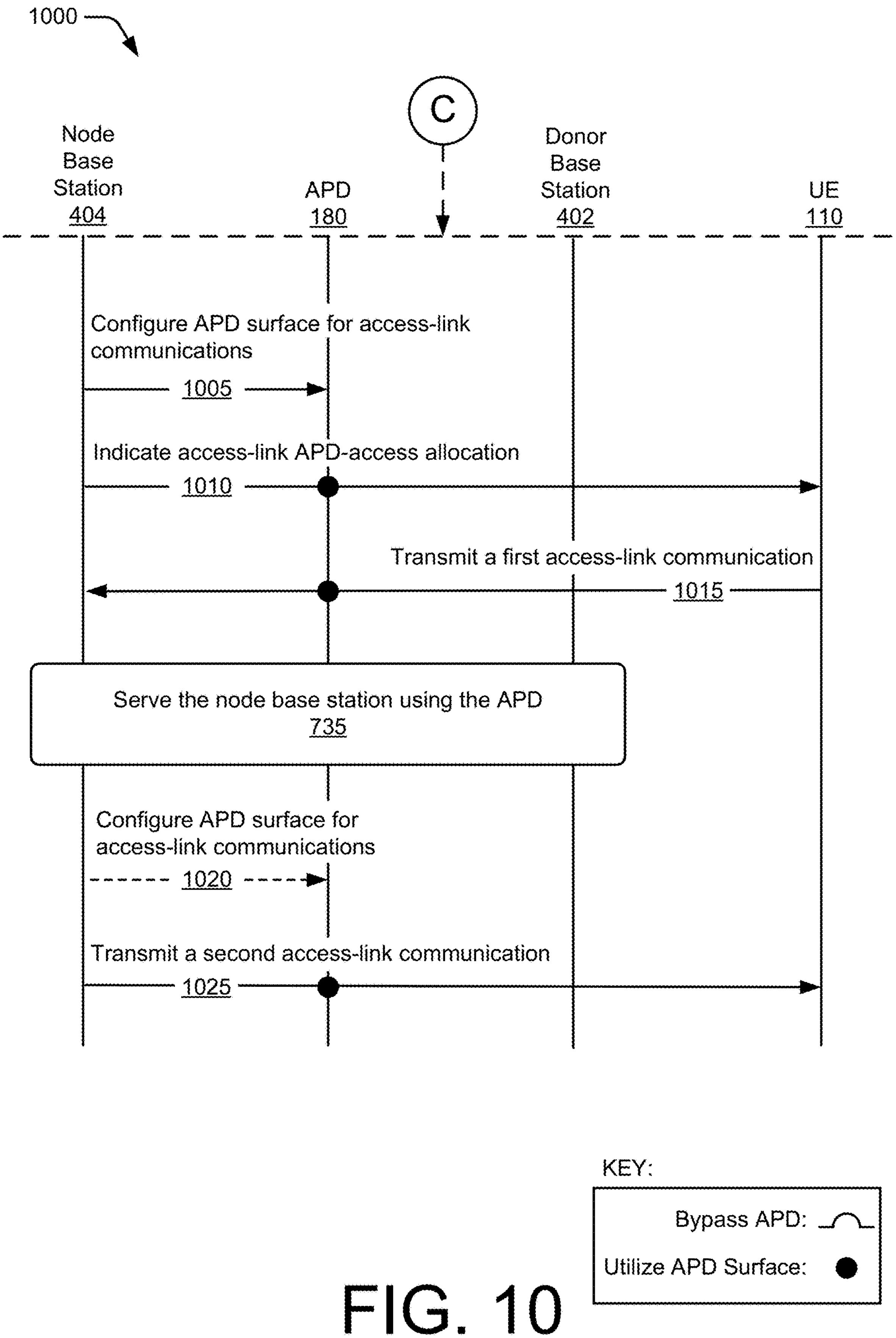
FIG. 10 continues from FIG. 9 and illustrates an example transaction diagram in which a node base station apportions APD-access to an access link with a user equipment (UE) and controls an APD surface for the access link in accordance with various aspects of integrated access backhaul with an APD.
Figure 11:
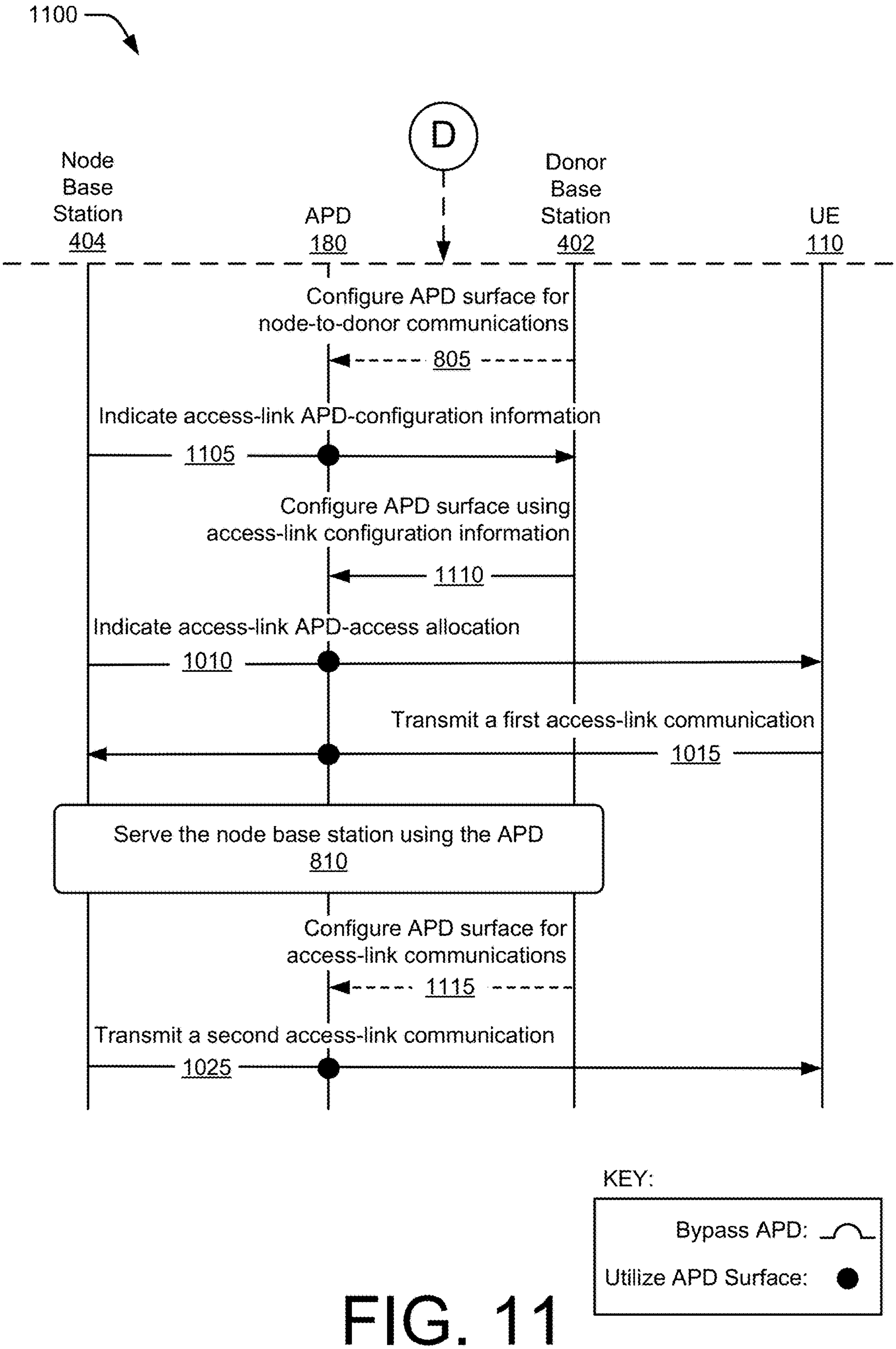
FIG. 11 continues from FIG. 9 and illustrates an example transaction diagram in which a donor base station controls an APD surface for an access link on behalf of a node base station in accordance with various aspects of integrated access backhaul with an APD.

FIG. 9 illustrates a second example of signaling and control transactions for integrated access backhaul with an APD with the signaling and control transaction diagram 900, where the diagram 900 leads to (c) additional signaling and control transactions as illustrated by FIG. 10, or (d) additional signaling and control transactions as illustrated by FIG. 11. The diagram 900 includes signaling and control transactions among the node base station 404, the APD 180, the donor base station 402, and the UE 110. Collectively, FIGS. 9-11 illustrate example implementations in which a node base station uses the APD 180 to communicate with a donor base station over an IAB link (e.g., the wireless link 406) and to communicate with a UE over an access-link (e.g., using the communication path 414).

At 630, the donor base station 402 and the node base station 404 establish apportioned APD access using similar signaling and control transactions described with reference to FIG. 6. For instance, the node base station and the donor base station establish a low-band connection, the node base station requests a high-band IAB link, and the donor base station determines to use the APD 180 in a communication path associated with the IAB link (e.g., the wireless link 406). The donor base station apportions APD-access to the APD 180 and indicates the apportioned APD-access to the node base station. This can include the donor base station indicating the apportioned APD-access to the node base station using the low-band connection or using a high-band connection and the surface of the APD 180 as further described.

At 705, the node base station 404 and the UE 110 establish a wireless connection with one another as described with reference to FIG. 7. To illustrate, the node base station 404 transmits wireless signals to (and/or receives wireless signals from) the UE, such as by transmitting/receiving mmWaves generally in an LoS manner with the UE 110 and without including the APD 180 in the communication path. Alternatively or additionally, the node base station 404 and the UE 110 exchange low-band communications.

As part of establishing the wireless connection, and/or in response to establishing the wireless connection, the node base station 404 receives signal- and/or link-quality measurements at 905. In some aspects, the UE 110 transmits measurement reports to the node base station, where the UE 110 generates the measurement reports based on downlink transmissions or reference signals from the node base station 404. Alternatively or additionally, the node base station 404 generates the signal and/or link-quality measurements based on uplink transmissions or sounding reference signals from the UE 110.

At 910, the node base station 404 determines to use the APD 180 for establishing and/or maintaining an access link to the UE 110. To illustrate, the node base station 404 analyzes the measurements received at 905 and determines that the measurements indicate a channel impairment as further described. However, the node base station may determine to use the APD 180 based on other factors, such as based on not receiving a response from the UE 110 (not illustrated) when using high-band communications.

At 915, the node base station 404 allocates a portion of the APD-access received at 630 to the access link with the UE 110. For instance, the node base station determines to use a first portion of the reflection-access received at 630 (and assigned to the node base station 404 by the donor base station 402) to access-link communications with the UE 110 (and using the communication path 414) and a second portion of the reflection-access received at 630 for IAB communications (using the wireless link 406) with the donor base station 402.

At this point, the diagram 900 can proceed to at least two alternative paths: option "C" (described in FIG. 10) or option "D" (described in FIG. 11). FIG. 10 depicts a signaling and control transaction diagram 1000 in which a node base station uses the APD surface for both access-link and IAB-link communications, where the node base station communicates a surface configuration to an APD directly over an APD-control channel. FIG. 11 depicts a signaling and control transaction diagram 1100 in which the node base station uses the APD surface for both access-link and IAB-link communications, where the donor base station configures the surface of the APD on behalf of the node base station.

FIG. 10 continues to option "C" where, at 1005, the node base station configures the APD surface for access-link communications (e.g., using the communication path 414). As one example, the node base station 404 analyzes a surface-configuration codebook or LUT using the signal- and/or link-quality measurements as described with reference to FIGS. 4 and 5 and selects a surface configuration for access-link communications from the surface-configuration codebook. Alternatively or additionally, the node base station 404 uses an estimated location of the UE 110 to select the surface configuration, such as by querying the core network or accessing historical records as further described. For instance, the UE indicates the estimated location to the node base station (not illustrated), and/or the node base station 404 generates the estimated location using the signal- and/or link-quality measurements (e.g., power levels, angles of departure or arrival, and/or timing information (e.g., observed time of arrival) of uplink or downlink communications with the UE 110). In aspects, the node base station 404 indicates a surface-configuration index to the APD 180 using the apportioned control-access (e.g., an APD-control channel) allocated to the node base station 404. Additionally, the node base station optionally indicates timing information (e.g., periodic timing information, dynamic timing information, a time duration) to the APD 180.

At 1010, the node base station 404 indicates an access-link APD-access allocation to the UE 110. In other words, the node base station 404 indicates the access-link APD-access allocation determined by the node base station at 915. To illustrate, the node base station indicates timing information and directs the UE 110 to use the surface of the APD based on the timing information. As another example, the node base station 404 optionally indicates a subset of configurable surface elements to the UE 110 and directs the UE 110 to direct transmissions towards the subset of configurable surface elements. In some aspects, as illustrated by the diagram 1000, the node base station 404 indicates the access-link APD-allocation to the UE 110 using high-band wireless signals transmitted towards the surface of the APD 180 and/or by using low-band communications (e.g., low-band communications established at 705).

At 1015, and in a manner similar to that described at 710 of FIG. 7, the UE 110 transmits a first access-link communication (e.g., control-plane information associated with the access-link, user-plane data associated with the access-link) to the node base station 404 using the surface of the APD (e.g., by transmitting wireless signals towards the surface of the APD 180). To illustrate, the UE 110 transmits a registration request, uplink user-data, a Non-Access Stratum (NAS) Authentication message, and so forth. In aspects, the UE transmits the first access-link communication based on the access-link APD-access allocation indicated at 1010, such as by transmitting towards a subset of configurable surface elements and/or based on timing information. In response to receiving the communication from the UE 110, the node base station 404 determines to communicate with the donor base station 402 using the IAB link and the APD.

At 735, the donor base station serves the node base station using the APD, such as by using similar signaling and control transactions as described with reference to FIG. 7. This can include the node base station 404 (optionally) configuring the surface of the APD 180 for node-to-donor communications using apportioned control-access to the APD 180. For example, the donor base station 402 and the node base station 404 communicate using the wireless link 406 as described and illustrated with reference to FIG. 4.

At 1020, the node base station optionally configures the APD surface for access-link communications. To illustrate, assume at 1005 that the node base station 404 did not indicate periodic timing information to the APD 180. Because the node base station 404 did not configure the APD 180 to periodically apply the access-link surface configuration, the node base station 404 (re)configures the APD surface at 1020 for access-link communications, such as by communicating an index that maps to an entry in a surface-configuration codebook in a manner similar to that as described at 1005 and/or as described with reference to FIG. 5. Alternatively, assume at 1005 that the node base station indicated periodic timing information to the APD 180. In such a scenario, the APD 180 configures the surface for access-link communications on a periodic basis, and the node base station does not need to reconfigure the surface at 1020.

At 1025, and in a manner similar to that described at 740 of FIG. 7, the node base station 404 transmits a second access-link communication to the UE 110, where the node base station uses the surface of the APD 180. To illustrate, the node base station 404 transmits the second access-link communication using the communication path 414 of FIG. 4. In other words, the node base station 404 communicates the response by transmitting wireless signals towards the APD surface and based on the access-link APD-access.

FIG. 11 continues to option “D” where a donor base station configures an APD surface for access-link communications between a node base station and a UE. At 805, the donor base station optionally configures the APD surface for node-to-donor communications as described with reference to FIG. 8.

At 1105, the node base station indicates access-link APD-configuration information to the donor base station. To illustrate, and similar to that described at 1005 of FIG. the node base station 404 determines a surface configuration for access-link communications and/or a portion of APD-access for the access-link communications. Accordingly, the node base station transmits the APD-configuration information (e.g., the surface configuration, the portion of APD-access for access-link communications) by using the surface of the APD and the IAB link as further described.

At 1110, the donor base station 402 directs the APD to configure the APD surface using the access-link configuration information. To illustrate, the donor base station 402 communicates an index that maps to an entry in a surface-configuration codebook and/or indicates timing information. In some aspects, the access-link surface configuration corresponds to a subset of configurable surface elements.

At 1010, the node base station indicates the access-link APD-access allocation to the UE 110. At 1015, the UE 110 transmits a first access-link communication (e.g., control-plane information associated with the access-link, user-plane data associated with the access-link) to the node base station 404.

At 810, the donor base station 402 serves the node base station as described with reference to FIG. 8. Here, the donor base station 402 (optionally) configures the surface of the APD 180 on behalf of the node base station 404 as needed.

At 1115, the donor base station 402 optionally configures the APD surface for access-link communications between the node base station 404 and the UE 110, such as in scenarios where the donor base station does not indicate periodic timing information to the APD at 1110. At 1025, and, based on the access-link APD-access, the node base station 404 transmits a second access-link communication to the UE 110 using the surface of the APD as described with reference to FIG. 10.

FIG. 12 illustrates a third example of signaling and control transactions for integrated access backhaul with an APD with the signaling and control transaction diagram 1200. In aspects, a donor base station determines an update for a surface configuration that configures an APD surface used in an IAB communication path as further described. The signaling and control transactions illustrated by the diagram 1200 can be used in combination with any of the features as described with reference to FIGS. 1-11.

At 630, the donor base station 402 and the node base station 404 establish apportioned APD access using similar signaling and control transactions described with reference to FIG. 6. For instance, the node base station and the donor base station establish a low-band control signaling connection, the node base station requests a high-band IAB link, and the donor base station determines to use the APD 180 in a communication path associated with the IAB link (e.g., wireless link 406). The donor base station apportions APD-access to the APD 180 and indicates the apportioned APD-access to the node base station. This can include the donor base station indicating the apportioned APD-access to the node base station using the low-band connection or using a high-band connection and the surface of the APD 180 as further described.

At a later point in time, at 1205, the node base station 404 optionally detects a channel impairment in the IAB link. For example, the node base station 404 analyzes transmissions received from the donor base station 402 over the IAB (e.g., transmissions received as described at 730 of FIG. 7), such as by generating signal- and/or link-quality measurements on the transmissions and determining that the measurements fall (or are trending to fall) below a threshold value. In response to detecting the channel impairment, the node base station 404 indicates the channel impairment to the donor base station 402 by transmitting wireless signals towards the surface of the APD 180 and based on the apportioned access determined at 630. When the node base station 404 does not detect a channel impairment, the node base station 404 does not transmit the indication at 1210, thus making the signaling/control transaction 1210 optional.

At 1215, the donor base station 402 detects a channel impairment. In some aspects, the donor base station detects the channel impairment by receiving the indication from the node base station transmitted at 1210. Alternatively or additionally, the donor base station analyzes transmissions received from the node base station 404 over the IAB (e.g., transmissions received as described at 720 of FIG. 7), such as by generating signal- and/or link-quality measurements on the transmissions and determining that the measurements fall (or are trending to fall) below a threshold value.

At 1220, and based on detecting the channel impairment, the donor base station 402 initiates a beam-sweeping procedure by directing the node base station 404 and the APD 180 to perform the beam-sweeping procedure. This can include the donor base station 402 initiating a full beam-sweeping procedure associated with sweeping through all surface configurations in a set of surface configurations (e.g., a set of surface configuration that covers a full range of predetermined reflection angles) or a partial beam-sweeping procedure that sweeps through a subset of surface configurations in the set of surface configurations. To illustrate, the donor base station 402 may initiate a full beam-sweeping procedure in which the APD 180 applies a full sequence of surface configurations that correspond to a broad beam-sweeping pattern. The broad beam-sweeping pattern configures the RIS to reflect an incident beam such that the reflected beam spans or sweeps a spatial region broadly (e.g., approximately 150 degrees to 30 degrees over the duration of the beam-sweeping procedure, approximately 10 o'clock to 3 o'clock on a clock face). In other words, the full sequence of surface configurations corresponds to a set of phase vectors in a surface-configuration codebook, where each phase vector corresponds to a respective reflection angle. As another example, the donor base station 402 may initiate a partial beam-sweeping procedure in which the APD 180 applies a subset of surface configurations from the full sequence such that the (resultant) partial beam-sweeping pattern configures the RIS to sweep the reflected beam over a smaller spatial region (e.g., approximately 90 degrees to 60 degrees, approximately 12 o'clock to 1 o'clock on a clock face).

In aspects, the donor base station 402 selects the beam-sweeping pattern based on location information associated with the node base station 404. For instance, assume the donor base station 402 has no location information for the node base station 404. In such a scenario, the donor base station 402 may select a full beam-sweeping pattern to improve the likelihood of locating the node base station 404. As another example, assume the donor base station 402 has an estimated location of the node base station 404. Using the estimated location, the donor base station 402 may select a partial beam-sweeping pattern centered on the estimated location to quickly select the surface configuration by performing a shorter beam-sweeping pattern with less surface configurations in the sequence.

To illustrate, assume the APD 180 stores a phase-sweeping and/or beam-sweeping codebook that indicates an order of surface configurations to cycle through at the APD (e.g., apply a first phase vector in the sequence over a first time-duration, apply a second phase vector in the sequence over a second time-duration, and so forth). After synchronizing the node base station 404 and the APD 180 to perform the beam-sweeping procedure, the donor base station 402 transmits high-band wireless signal(s), such as beam-formed signals (e.g., reference signals), towards the APD surface at 1225. The APD configures the APD surface based on the order of surface configurations (and/or time durations). At 1230, the node base station 404 generates measurement reports based on the different surface configurations applied at the APD surface. For instance, the node base station generates signal-quality measurements, such as a first signal-quality measurement based on transmissions received over the first time-duration when the APD 180 applies a first surface configuration to the APD surface, a second signal-quality measurement based on transmission received over the second time-duration when the APD 180 applies a second surface configuration to the APD surface, and so forth. Alternatively, or additionally, the node base station 404 transmits an SRS towards the surface of the APD 180 as part of the beam-sweeping procedure and as described with reference to FIG. 13.

At 715, the node base station 404 optionally configures the APD surface for node-to-donor communications as described with reference to FIG. 7. For example, the node base station 404 indicates a donor index or a node index to the APD 180 and optionally indicates direction information. Alternatively, the donor base station 402 optionally configures the APD surface (not illustrated in FIG. 12) as described at 805 of FIG. 8. At 1235, the node base station communicates the measurement reports generated at 1230 to the donor base station, such as by transmitting the measurement reports over the IAB link and using the surface of the APD.

Generally, the transactions 1225, 1230, 715, and 1235 correspond to a sub-diagram 1240 in which the donor base station 402, the APD 180, and the node base station 404 perform a beam-sweeping procedure using the APD and transmissions from the donor base station to the node base station. The sub-diagram 1240 can include alternative or additional transactions not illustrated in FIG. 12 for visual brevity. For example, the sub-diagram 1240 can alternatively or additionally include the transactions as described with reference to FIG. 13, in which a donor base station receives transmissions from a node base station.

At 1245, the donor base station 402 determines an updated surface configuration for the APD 180 that configures the APD surface for IAB link communications (e.g., node-to-donor transmissions, donor-to-node transmissions). For instance, the donor base station analyzes the measurement reports received at 1235 and identifies the surface-configuration update by selecting the surface configuration with acceptable measurement reports. To illustrate, the donor base station analyzes the measurement reports to identify the surface configuration (out of the multiple surface configurations applied by the APD during the beam-sweeping procedure) with the best measurement report relative to the other surface configurations (e.g., the surface configuration with the highest signal-quality measurement).

At 1250, the donor base station 402 directs the APD to update the surface-configuration codebook and/or LUT with the updated surface configuration determined at 1245. As one example, the donor base station 402 communicates (e.g., using the wireless link 136) the updated surface configuration (determined by the donor base station at 1245) to the APD 180, such as by indicating a pattern index that points to the surface configuration applied in the (full or partial) sequence that corresponds to the updated surface configuration. Alternatively or additionally, the donor base station 402 communicates a node index value to the APD 180. The donor base station 402 implicitly or explicitly directs the APD 180 to use the node index to locate an entry in a surface-configuration codebook and update the entry with the updated surface configuration (indicted by the pattern index). In response to receiving the directions, the APD 180 updates the entry in the surface-configuration codebook and/or LUT at 1255.

FIG. 13 illustrates a signaling and control transaction diagram 1300 that includes alternative or additional signaling and control transactions that can be used to implement the sub-diagram 1240 of FIG. 12 for various aspects of integrated access backhaul with an APD. Accordingly, the sub-diagram 1240 illustrated by the diagram 1300 includes alternative or additional transactions that can be combined with, or replace, the signaling and control transactions of the sub-diagram 1240 illustrated by the diagram 1200.

The diagram 1300 begins at 1305, where the node base station 404 optionally initiates the beam-sweeping procedure. For example, assume the diagram 1300 begins after 1220 of FIG. 12 (not illustrated in FIG. 13). In aspects, at 1220, the donor base station 402 may initiate a first beam-sweeping procedure that corresponds to the donor base station 402 transmitting signals towards the APD 180 (e.g., the diagram 1200) and direct the node base station 404 to initiate a second beam-sweeping procedure in which the node base station 404 transmitting signals towards the APD 180. Accordingly, and in a manner similar to that described at 1220, the node base station 404 optionally initiates a beam-sweeping procedure at 1305, such as a full beam-sweeping procedure and/or a partial beam-sweeping procedure as further described. Alternatively, or additionally, at 1220, the donor base station 402 synchronizes the node base station 404 and the APD 180 to perform the beam-sweeping procedure described by the diagram 1300.

At 1310, the node base station 404 transmits wireless signal(s) (e.g., beam-formed wireless reference signals) towards the APD surface. The APD configures the APD surface based on the order of surface configurations (and/or time durations), and the donor base station 402 generates measurement reports at 1315 using transmissions received at the donor base station and based on the different surface configurations applied at the APD surface. For instance, the donor base station generates signal-quality measurements, such as a first signal-quality measurement based on transmissions received over the first time-duration when the APD 180 applies a first surface configuration to the APD surface, a second signal-quality measurement based on transmission received over the second time-duration when the APD 180 applies a second surface configuration to the APD surface, and so forth.

Figure 14:
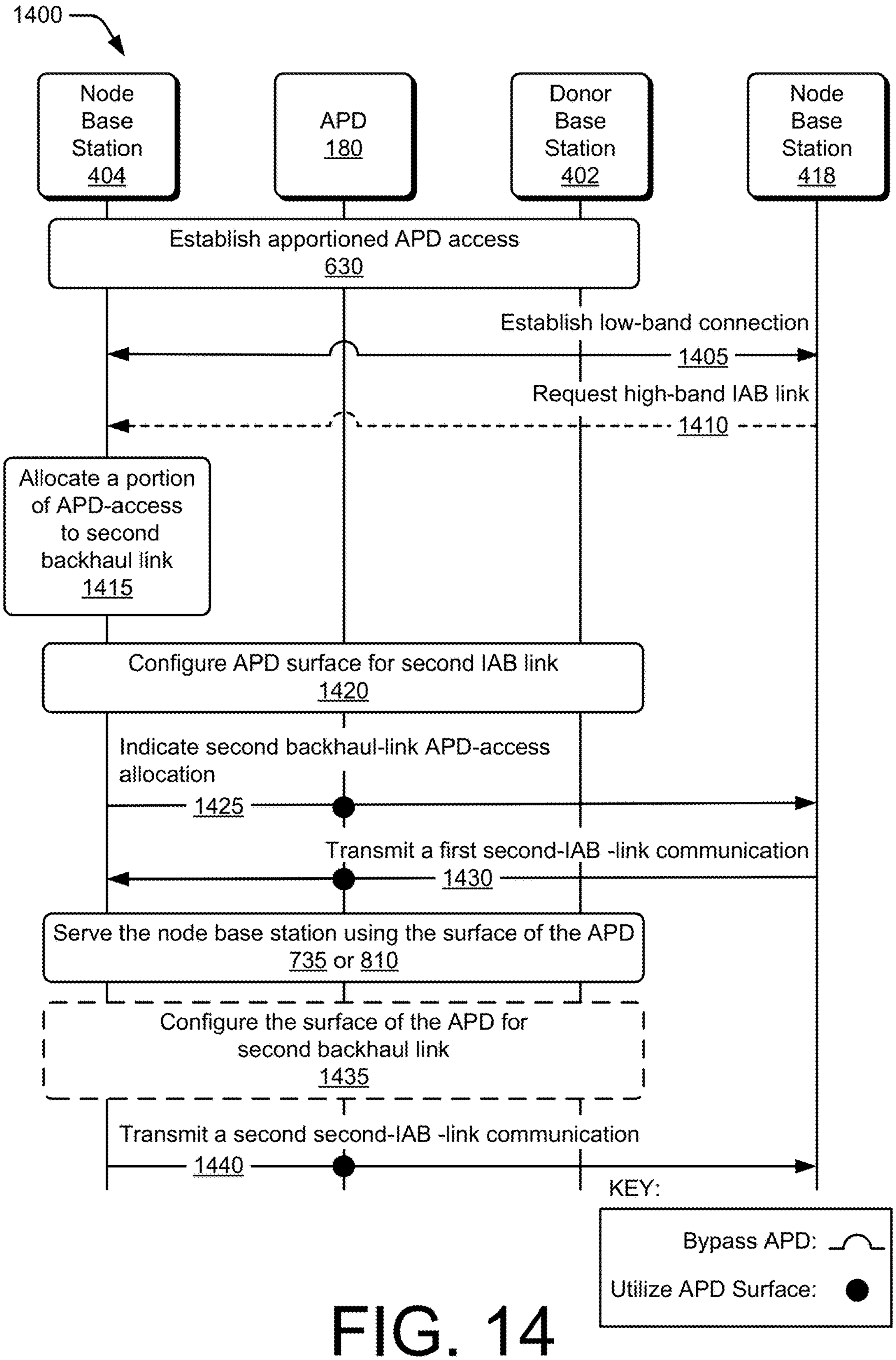
FIG. 14 illustrates an example transaction diagram in which a first node base station serves a second node base station in accordance with various aspects of integrated access backhaul with an APD.

FIG. 14 illustrates a fourth example of signaling and control transactions for integrated access backhaul with an APD with the signaling and control transaction diagram 1400. The diagram 1400 includes signaling and control transactions among a first node base station 404, the APD 180, the donor base station 402, and a second node base station 418. In aspects, the first node base station 404 uses a first IAB link (e.g., the wireless link 406 of FIG. 4) with the donor base station to serve a second node base station 418 using a second IAB link (e.g., using the communication path 420 of FIG. 4). The signaling and control transactions illustrated by the diagram 1400 can be used in combination with any of the features as described with reference to FIGS. 1-13.

At 630, the donor base station 402 and the first node base station 404 establish apportioned APD access using similar signaling and control transactions described with reference to FIG. 6. For instance, the first node base station and the donor base station establish a low-band connection, the first node base station (optionally) requests a high-band IAB link, and the donor base station determines to use the APD 180 in a communication path associated with the IAB link. The donor base station apportions APD-access to the APD 180 and indicates the apportioned APD-access to the node base station. This can include the donor base station indicating the apportioned APD-access to the node base station using the low-band connection or using a high-band connection and the surface of the APD 180 as further described.

At 1405, the second node base station 418 establishes a low-band connection with the first node base station 404. To illustrate, the second node base station 418 (or the first node base station 404) identifies that high-band communications (e.g., mmWave) with the first node base station 404 (or second node base station 418) have poor quality, such as by analyzing signal- or link-quality measurements associated with high-band communications and determining that the measurements have fallen below an acceptable performance threshold. As another example, the second node base station 418 fails to receive a response from the first node base station 404 after transmitting a request using high-band communications (or vice versa). In response to identifying that the high-band communications have poor quality (or failing to receive a response), the second node base station 242 and the first node base station 404 establish a wireless low-band connection to the first node base station 404. In some aspects, the second node base station 418 indicates location information to the first node base station 404 using the low-band connection (not illustrated), such as by transmitting GNSS and/or GPS location information. In establishing the wireless low-band connection, the first node base station 404 and the second node base station 418 bypass the surface of the APD insofar as neither base station actively configures the surface of the APD or transmits signals towards the surface of the APD with an intent of reflecting and/or redirecting the wireless signals as further described.

At 1410, the second node base station 418 optionally requests a high-band IAB link with the first node base station 404. The second node base station 418, for instance, transmits the request to the first node base station 404 in a manner similar to that described at 610 of FIG. 6 by transmitting the request using the low-band connection established at 1405 and bypassing the APD. In alternative aspects, the first node base station 404 determines to establish the high-band IAB with the second node base station 418 and without receiving a request.

At 1415, the first node base station allocates a portion of the APD-access received at 630 (and allocated to the first node base station 404 by the donor base station 402) to the second IAB link with the second node base station 418. For instance, the first node base station 404 determines to use a first portion of the reflection-access received at 630 to IAB communications with the donor base station 402 (using a first IAB link) and a second portion of the reflection-access to IAB communications with the second node base station 418 (using a second IAB link). At times, the first node base station 404 may allocate a third portion of the reflection-access to access-link communications with a UE (not illustrated in FIG. 14) in a manner similar to that described with reference to FIGS. 9-11.

At 1420, the first node base station 404 and/or the donor base station 402 configure the APD surface of the APD 180 for communications associated with the second IAB link. In some aspects, the first node base station 404 directly configures the APD surface, such as in a manner similar to that described at 715 of FIG. 7 and 1005 of FIG. 10. In other aspects, the donor base station 402 configures the APD surface on behalf of the first node base station, such as in a manner similar to that described at 1105 and at 1110 of FIG. 11.

At 1425, the first node base station 404 indicates the second backhaul-link APD-access to the second node base station 418. For example, in a manner similar to that described at 1010 of FIG. 10, the first node base station 404 indicates a subset of configurable surface elements and/or timing information to the second node base station 418. In some aspects, as illustrated by the diagram 1400, the node base station 404 indicates the second backhaul-link APD-access allocation to the second node base station 418 by transmitting wireless signals towards the surface of the APD 180.

At 1430, and using the second IAB link (e.g., using the communication path 420), the second node base station 418 transmits a first second-IAB-link communication (e.g., control-plane information, user-plane data) to the first node base station 404. Sometimes the second node base station bases the first second-IAB-link communication on an access link with a UE (e.g., UE 424) served by the second node base station (not illustrated), while other times, the second node base station 418 does not base the first second-IAB-link communication on access-link communications with a UE.

The donor base station 402 serves the first node base station 404 using signaling and control transactions similar to those described at 735 of FIG. 7 or 810 of FIG. 8.

Accordingly, the donor base station 402 may serve the first node base station 404 by (optionally) controlling the surface configuration of the APD 180, or with the first node base station 404 (optionally) controlling the surface configuration of the APD 180.

At 1435, the first node base station 404 and/or the donor base station 402 optionally configure the surface of the APD for second-backhaul-link communications using signaling and control transactions similar to that described at 1020 of FIG. 10 or at 1115 of FIG. 11. At 1440, the first node base station 404 transmits a second second-IAB-link communication to the second node base station 418 using the second IAB link and the surface of the APD 180 as further described.

Example Methods for Integrated Access Backhaul with an APD

Figure 15:
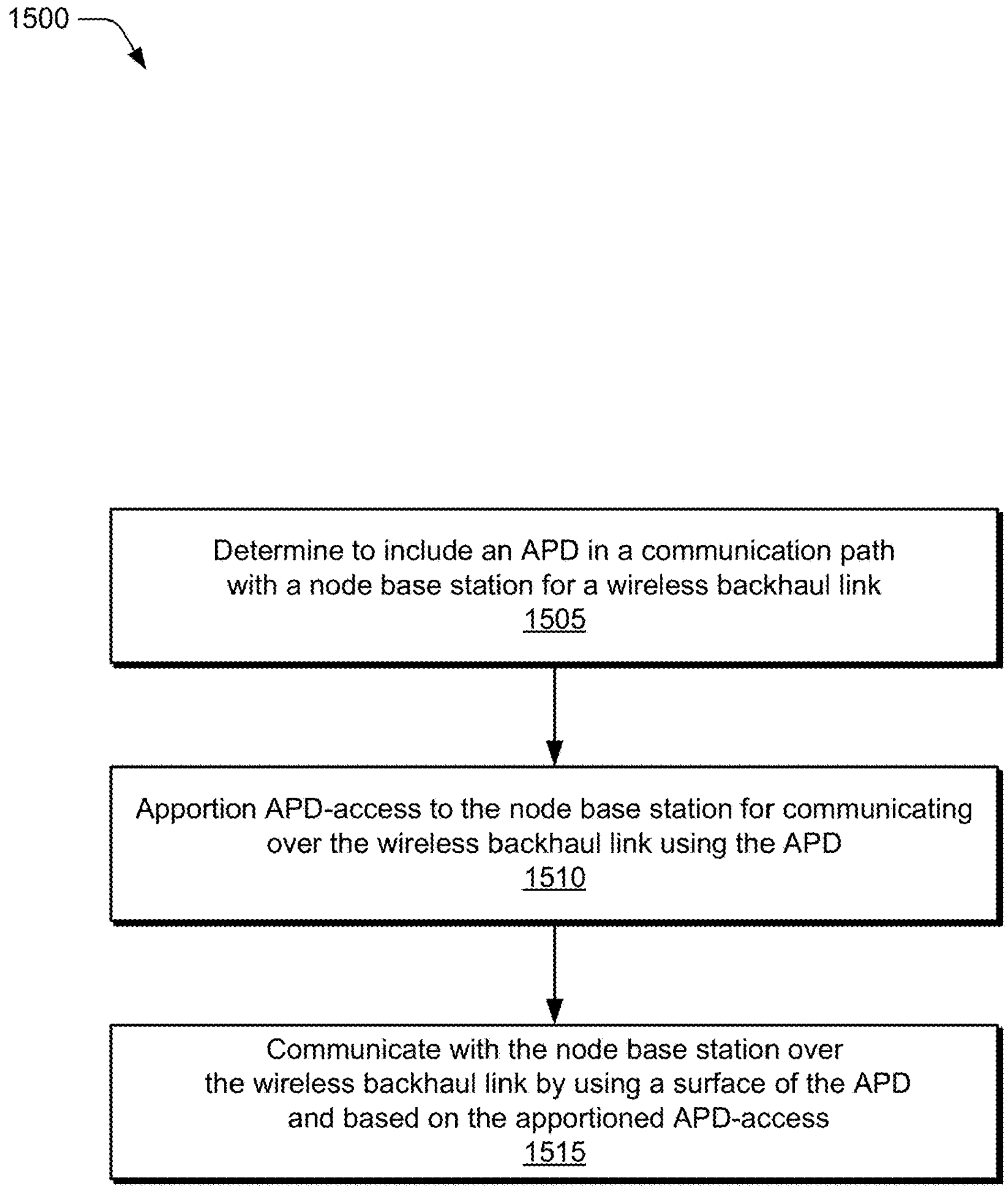
FIG. 15 illustrates an example method that implements various aspects of integrated access backhaul with an APD.

Example methods 1500, 1600, and 1700 are described with reference to FIGS. 15, 16, and 17 and in accordance with one or more aspects of integrated backhaul access using an APD. FIG. 15 illustrates an example method 1500 used to perform aspects of integrated backhaul access using an APD, such as donor base station apportion access to an APD for use in an IAB link with a node base station. In some implementations, operations of the method 1500 are performed by the donor base station 402 as described with reference to any of FIGS. 1-14.

At 1505, a donor base station determining to include an APD in a communication path with a node base station for a wireless backhaul link. For instance, the donor base station 402 determines to include the APD 180 in a communication path with the node base station 404 as described at 615 of FIG. 6.

At 1510, the donor base station apportions APD-access to the node base station, such as apportioned APD-access for communicating over the wireless backhaul link using the APD. As one example, the donor base station 402 apportions reflection-access and/or control-access to the node base station 404 as described at 620 of FIG. 6.

At 1515, the donor base station communicates with the node base station over the wireless backhaul link by using a surface of the APD and based on the apportioned APD-access, such as by using the surface to exchange wireless signals. The donor base station 402, for instance, communicates with the node base station 404 as described at 735 of FIGS. 7, 10, and 14 and/or as described at 810 of FIGS. 8, 11, and 14.

Figure 16:
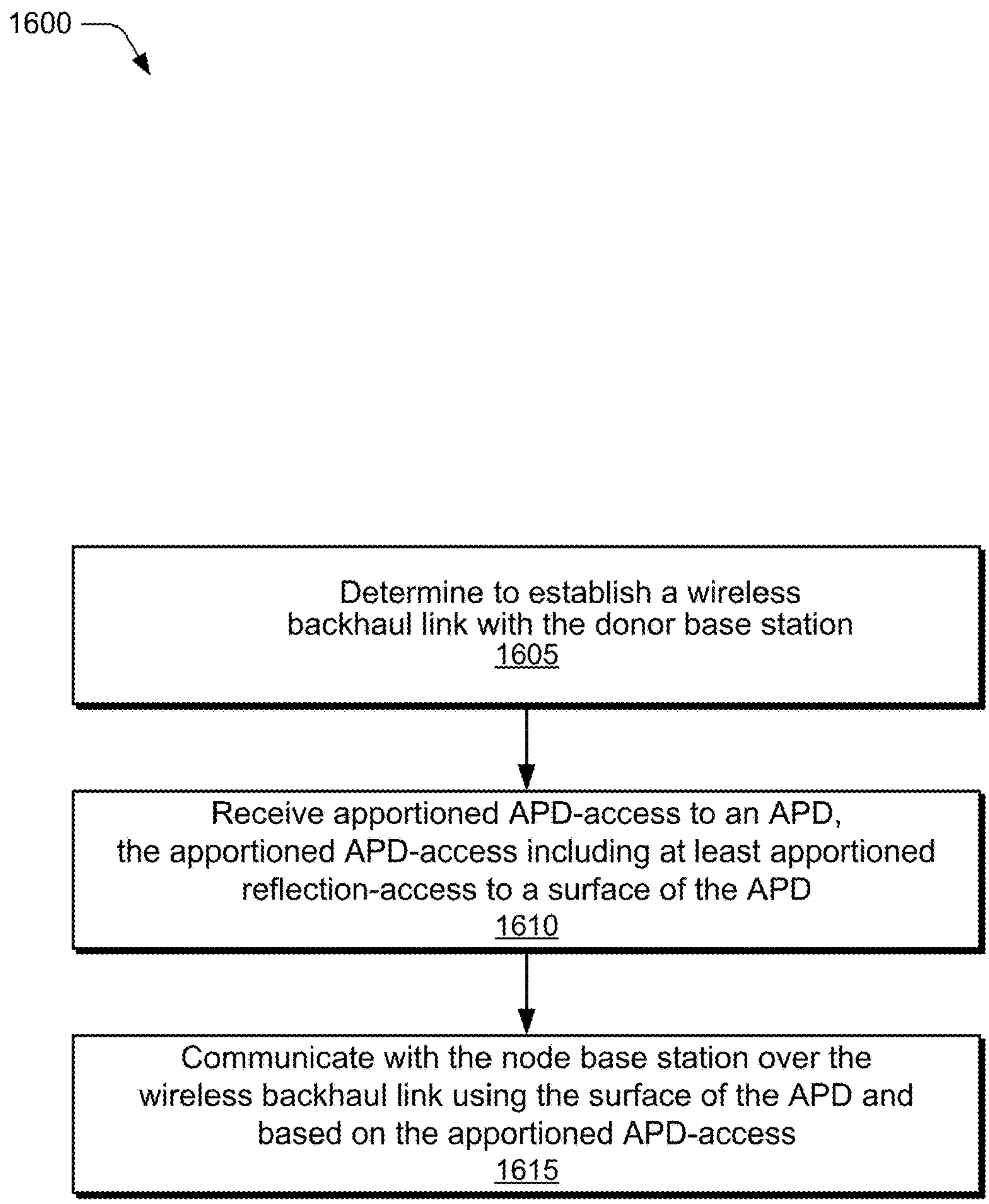
FIG. 16 illustrates an example method that implements various aspects of integrated access backhaul with an APD.

FIG. 16 illustrates an example method 1600 used to perform aspects of integrated backhaul access using an APD, such as node base station receiving apportion access to an APD for use in an IAB link with a donor base station. In some implementations, operations of the method 1600 are performed by the node base station 404 as described with reference to any of FIGS. 1-15.

At 1605, a node base station determines to establish a wireless backhaul link with a donor base station. To illustrate, the node base station 404 determines to establish a wireless backhaul link with the donor base station 402 as described at 605 and/or at 610 of FIG. 6.

At 1610, the node base station receives apportioned APD-access to an APD from the donor base station, the apportioned APD-access including at least apportioned reflection-access to a surface of the APD. To illustrate, the node base station 404 receives apportioned reflection-access and/or control-access to the APD 180 from the donor base station 402 as described at 625 of FIG. 6.

At 1615, the node base station communicates with the donor base station over the wireless backhaul link using the surface of the APD and based the apportioned APD-access, such as by using the surface to exchange wireless signals with the donor base station. To illustrate, the node base station 404 communicates with the donor base station 402 as described at 735 of FIGS. 7, 10, and 14 and/or as described at 810 of FIG. 8, 11, or 14.

Figure 17:
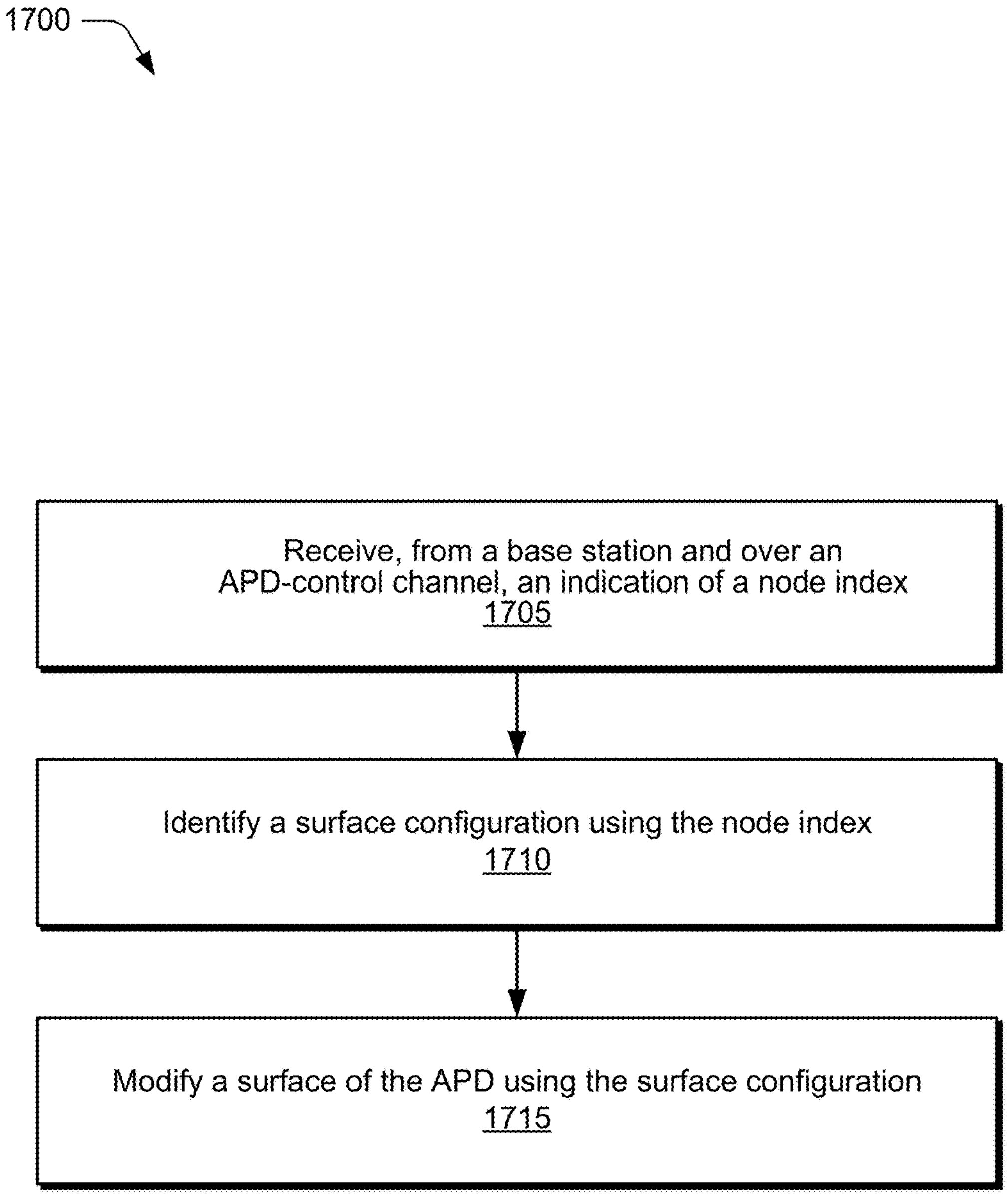
FIG. 17 illustrates an example method that implements various aspects of integrated access backhaul with an APD.

FIG. 17 illustrates an example method 1700 used to perform aspects of integrated backhaul access using an APD, such as APD configuring a surface using node-index information. In some implementations, operations of the method 1700 are performed by the APD 180 as described with reference to any of FIGS. 1-16

At 1705, an APD receives, from a base station and over an APD-control channel, an indication of a node index. To illustrate, the APD 180 receives the node index from the donor base station 402 or the node base station 404 as described at 735 of FIGS. 7, 10, and 14 and/or at 810 of FIGS. 8, 11, and 14.

At 1710, the APD identifies a surface configuration using the node index. For instance, the APD 180 identifies the surface configuration as described at 735 with reference to FIGS. 7, 10, and 14, at 810 with reference FIGS. 8, 11, and 14, and/or as described with reference to FIGS. 4 and 5.

At 1715, the APD modifies the surface of the APD using the surface configuration. The APD 180, for instance, modifies the surface of the APD as described at 735 with reference to FIGS. 7, 10, and 14, at 810 with reference FIGS. 8, 11, and 14, and/or as described with reference to FIGS. 4 and 5.

The order in which the method blocks of the method 1500, 1600, and 1700 are described are not intended to be construed as a limitation, and any number of the described method blocks can be skipped or combined in any order to implement a method or an alternative method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively, or additionally, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

In the following some examples are described:

Example 1: A method performed by a first base station for communicating over a wireless backhaul link with a node base station, the method comprising:

determining to include an adaptive phase-changing device, APD, in a communication path for the wireless backhaul link;

apportioning APD-access to the node base station for communicating over the wireless backhaul link using the APD; and communicating with the node base station over the wireless backhaul link using a surface of the APD and based on the apportioned APD-access.

Example 2: The method as recited in example 1, wherein the apportioning APD-access to the node base station further comprises at least one of:

apportioning reflection-access to the node base station; or apportioning control-access to the node base station.

Example 3: The method as recited in example 2, wherein the apportioning APD-access to the node base station comprises further comprises:

apportioning physical resources of an APD-control channel to the node base station.

Example 4: The method as recited in example 3, wherein apportioning the physical resources further comprises:

apportioning the physical resources using at least one of:

frequency-partitioning;

time-partitioning; or coding-scheme-partitioning.

Example 5: The method as recited any one of examples 1 to 4, wherein the apportioning APD-access to the node base station comprises:

apportioning the reflection-access to the node base station using at least one of:

time-partitioning of APD-surface access; or configurable-surface-element partitioning of APD-surface access.

Example 6: The method as recited in any one of examples 1 to 5, the apportioning APD-access to the node base station further comprises:

indicating, to the APD, a node index from a codebook associated with the node base station.

Example 7: The method as recited in example 6, further comprising:

indicating, to the APD, at least one of:

time information; or direction information.

Example 8: The method as recited in any one of examples 1 to 7, wherein the apportioning APD-access to the node base station comprises:

determining to change a surface of the APD based on the node base station;

determining a second surface configuration for the surface of the APD based on the node base station; and directing the APD to update the surface of the APD using the second surface configuration.

Example 9: The method as recited in example 8, further comprising:

directing the APD to update a look-up-table or surface-configuration codebook with at least the second surface configuration.

Example 10: The method as recited in example 9, wherein directing the APD to update the look-up table further comprises:

directing the APD to update an entry in the look-up-table or the surface-configuration codebook with the second surface configuration, the entry being associated with the node base station.

Example 11: The method as recited in any one of examples 8 to 10, wherein determining to change the surface of the APD further comprises:

identifying a channel impairment in the communication path for the wireless backhaul link; and determining to change the surface configuration based on identifying the channel impairment.

Example 12: The method as recited in example 11, wherein identifying the channel impairment further comprises:

generating a first signal- or link-quality measurement based on received node-to-donor wireless transmissions; and determining the first signal- or link-quality measurement falls below a first threshold value.

Example 13: The method as recited in example 11 or example 12, wherein identifying the channel impairment further comprises:

receiving, from the node base station, a second signal- or link-quality measurement based on donor-to-node wireless transmissions; and determining the second signal- or link-quality measurement falls below a second threshold value.

Example 14: The method as recited in any one of examples 8 to 13, wherein the determining the second surface configuration for the surface of the APD further comprises:

performing a beam-sweeping procedure with the APD and the node base station; and selecting the second surface configuration using the beam-sweeping procedure.

Example 15: The method as recited in example 14, wherein performing the beam-sweeping procedure further comprises:

performing a full beam-sweeping procedure; or performing a partial beam-sweeping procedure.

Example 16: The method as recited in any one of examples 1 to 15, wherein the apportioning APD-access to the node base station further comprises:

directing the APD to configure the surface of the APD for donor-to-node wireless communications; or directing the APD to configure the surface of the APD for node-to-donor wireless communications.

Example 17: The method as recited in any one of examples 1 to 16, wherein the apportioning the APD-access to the node base station further comprises:

allocating, as the apportioned APD-access, a first portion of the APD-access to the first base station; and allocating, as the apportioned APD-access, a second portion of the APD-access to the node base station.

Example 18: The method as recited in example 17, further comprises allocating a portion of the apportioned APD-access to access-link communications; and communicating, based on the first portion of the APD-access, with a user equipment, UE, by using the surface of the APD to exchange access-link wireless communications.

Example 19: The method as recited in any one of examples 1 to 18, wherein the first base station is a donor base station.

Example 20: The method as recited in any one of examples 1 to 18, wherein the node base station is a second node base station, and first base station is a first node base station.

Example 21: A method performed by a node base station for communicating over a wireless backhaul link with a donor base station, the method comprising:

determining to establish a wireless backhaul link with the donor base station;

receiving, from the door base station, apportioned APD-access to an APD, the apportioned APD-access including at least apportioned reflection-access to a surface of the APD; and communicating with the donor base station over the wireless backhaul using the surface of the APD and based on the apportioned APD-access Example 22: The method as recited in example 21, wherein receiving the apportioned APD-access further comprises:

receiving apportioned control-access to the APD.

Example 23: The method as recited in example 22, wherein receiving the apportioned control-access further comprises:

receiving apportioned physical resources of an APD-control channel.

Example 24: The method as recited in example 23, wherein receiving the apportioned physical resources of the APD-control channel further comprises:

receiving physical resources of the APD-control channel that have been apportioned using at least one of:

frequency-partitioning;

time-partitioning; or coding-scheme-partitioning.

Example 25: The method as recited in any one of examples 22 to 24, further comprising:

indicating a surface configuration to the APD using the apportioned control-access.

Example 26: The method as recited in example 25, wherein indicating surface configuration further comprises:

indicating a node index associated with the donor base station to the APD.

Example 27: The method as recited in example 26, further comprising:

indicating time information to the APD that specifies when to configure the surface of the APD using the surface configuration based on node-to-donor wireless communications.

Example 28: The method as recited any one of examples 21 to 27, wherein the apportioned reflection access comprises at least one of:

time-partitioned reflection-access; or configurable-surface-element partitioned reflection-access.

Example 29: The method as recited in any one of examples 21 to 28, further comprising:

assigning a portion of the apportioned APD-access to access-link communications; and communicating with a user equipment, UE, using the surface of the APD and based on the portion of the apportioned APD-access.

Example 30: The method as recited in example 29, further comprising:

determining an access-link surface configuration for the APD; and directing the APD to configure the surface of the APD with the access-link surface configuration.

Example 31: The method as recited in example 30, wherein directing the APD to configure the surface of the APD with the access-link surface configuration further comprises:

communicating the access-link surface configuration to the APD using apportioned control-access to the APD.

Example 32: The method as recited in any one of examples 21 to 31, further comprising:

providing a second backhaul link to a second node base station based on the apportioned APD-access.

Example 33: The method as recited in example 32, further comprising:

exchanging wireless signals associated with the second backhaul link with the second node base station using the surface of the APD.

Example 34: A method performed by an adaptive phase-changing device, APD, for configuring a surface of the APD, the method comprising:

receiving, from a base station and over an APD-control channel, an indication of a node index;

identifying a surface configuration using the node index; and modifying the surface of the APD using the surface configuration.

Example 35: The method as recited in example 34, further comprising receiving, from the base station, time information that specifies when to configure the surface of the APD, and wherein modifying the surface of the APD comprises modifying the surface of the APD based on the time information.

Example 36: The method as recited in example 34 or example 35, further comprising:

receiving, from the base station, direction information that specifies a reflection direction for the surface of the APD, and wherein identifying the surface configuration comprises:

identifying the surface configuration based on the direction information.

Example 37: The method as recited in any one of examples 34 to 36, further comprising:

receiving, from the base station, a second surface configuration;

receiving, from the base station, directions to update a look-up table;

locating an entry in the look-up table using the node index; and updating the look-up table by replacing the entry in the look-up table with the second surface configuration.

Example 38: A donor base station comprising:

a processor; and computer-readable storage media comprising instructions, responsive to execution by the processor, for directing the donor base station to perform a method as recited in any one of examples 1 to 20.

Example 39: A node base station comprising:

a processor; and computer-readable storage media comprising instructions, responsive to execution by the processor, for directing the node base station to perform a method as recited in any one of examples 21 to 33.

Example 40: An adaptive phase-changing device, APD, comprising:

a reconfigurable intelligent surface, RIS;

at least one wireless transceiver;

a processor; and computer-readable storage media comprising instructions, responsive to execution by the processor, for directing the APD to perform any one of the methods recited in examples 34 to 37.

Example 41: A computer-readable storage media comprising instructions that, responsive to execution by a processor, direct the processor to perform a method as recited in any one of examples 1 to 37.

Although aspects of integrated backhaul access using an APD have been described in language specific to features and/or methods, the subject of the appended claims is not necessarily limited to the specific features or methods described. Rather, the specific features and methods are disclosed as example implementations of integrated backhaul access using an APD, and other equivalent features and methods are intended to be within the scope of the appended claims. Thus, the appended claims include a list of features that can be selected in "any combination thereof," which includes combining any number and any combination of the listed features. Further, various different aspects are described, and it is to be appreciated that each described aspect can be implemented independently or in connection with one or more other described aspects.

The invention claimed is:

1. A method performed by a first base station for communicating over a wireless backhaul link with a node base station, the method comprising:

determining to include an adaptive phase-changing device (APD) in a communication path for the wireless backhaul link;

apportioning APD reflection-access to the node base station for communicating over the wireless backhaul link using a surface of the APD, the apportioning comprising indicating, to the APD, a node index from a codebook associated with the node base station; and communicating with the node base station over the wireless backhaul link using the surface of the APD and based on the apportioned APD reflection-access.

2. The method as recited in claim 1, wherein the apportioning further comprises:

apportioning APD control-access to the node base station.

3. The method as recited in claim 1, wherein the apportioning further comprises:

apportioning physical resources of an APD-control channel to the node base station.

4. The method as recited in claim 3, wherein the apportioning of the physical resources further comprises:

apportioning the physical resources using at least one of:

frequency-partitioning;

time-partitioning; or coding-scheme-partitioning.

5. The method as recited claim 1, wherein the apportioning comprises:

apportioning the reflection-access to the node base station using at least one of:

time-partitioning of APD-surface access; or configurable-surface-element partitioning of APD-surface access.

6. The method as recited in claim 1, wherein the apportioning comprises:

determining to change a surface of the APD based on the node base station;

determining a second surface configuration for the surface of the APD based on the node base station;

directing the APD to update the surface of the APD using the second surface configuration; and directing the APD to update a look-up-table or surface-configuration codebook with at least the second surface configuration.

7. The method as recited in claim 6, wherein the determining to change the surface of the APD further comprises:

identifying a channel impairment in the communication path for the wireless backhaul link; and determining to change the surface configuration based on identifying the channel impairment.

8. The method as recited in claim 6, wherein the determining of the second surface configuration further comprises:

performing a beam-sweeping procedure with the APD and the node base station; and selecting the second surface configuration using the beam-sweeping procedure.

9. The method as recited in claim 1, wherein the apportioning further comprises:

allocating, as the apportioned APD reflection-access, a first portion of the APD reflection-access to the first base station; and allocating, as the apportioned APD reflection-access, a second portion of the APD reflection-access to the node base station.

10. The method as recited in claim 9, further comprising:

allocating a portion of the apportioned APD reflection-access to access-link communications; and communicating, based on the first portion of the APD reflection-access, with a user equipment (UE) by using the surface of the APD to exchange access-link wireless communications.

11. A method performed by a node base station for communicating over a wireless backhaul link with a donor base station, the method comprising:

determining to establish a wireless backhaul link with the donor base station;

receiving, from the donor base station, apportioned APD reflection-access to a surface of an adaptive phase-changing device (APD), the apportioned APD reflection-access of the APD provided based on a node index from a codebook associated with the node base station; and communicating with the donor base station over the wireless backhaul using the surface of the APD and based on the apportioned APD reflection-access.

12. The method as recited in claim 11, wherein the receiving further comprises:

receiving apportioned control-access to the APD.

13. The method as recited in claim 12, wherein the receiving further comprises:

receiving physical resources of an APD-control channel that have been apportioned using at least one of:

frequency-partitioning;

time-partitioning; or coding-scheme-partitioning.

14. The method as recited in claim 12, further comprising:

indicating a surface configuration to the APD using the apportioned control-access; and indicating time information to the APD that specifies when to configure the surface of the APD using the surface configuration based on node-to-donor wireless communications.

15. The method as recited claim 11, wherein the apportioned APD reflection-access comprises at least one of:

time-partitioned reflection-access; or configurable-surface-element partitioned reflection-access.

16. The method as recited in claim 11, further comprising:

providing a second backhaul link to a second node base station based on the apportioned APD reflection-access.

17. A base station comprising:

a processor; and computer-readable storage media comprising instructions that, responsive to execution by the processor, direct the base station to:

determine to include an adaptive phase-changing device (APD) in a communication path for a wireless backhaul link with a node base station;

apportion APD reflection-access to the node base station to enable communication over the wireless backhaul link using a surface of the APD, the apportionment comprising an indication, to the APD, of a node index from a codebook associated with the node base station; and communicate with the node base station over the wireless backhaul link using the surface of the APD and based on the apportioned APD reflection-access.

18. The base station as recited in claim 17, wherein the processor is further directed to:

apportion APD control-access to the node base station.

19. The base station as recited in claim 17, wherein the processor is further directed to:

apportion physical resources of an APD-control channel to the node base station.

* * * * *